United States Patent [19]

Takagi et al.

[11] 4,183,072
[45] Jan. 8, 1980

[54] PROTECTIVE RELAYING SYSTEM

[75] Inventors: Toshio Takagi, Tokyo; Katsuhiko Uemura; Toshiaki Sakaguchi, both of Amagasaki, all of Japan

[73] Assignees: Mitsubishi Denki Kabushiki Kaisha; The Tokyo Electric Power Co., Inc., both of Japan

[21] Appl. No.: 863,677

[22] Filed: Dec. 23, 1977

[30] Foreign Application Priority Data

Dec. 29, 1976 [JP] Japan .................................. 51-158128
Dec. 29, 1976 [JP] Japan .................................. 51-158131
Dec. 29, 1976 [JP] Japan .................................. 51-158132

[51] Int. Cl.² ........................................... H02H 3/28
[52] U.S. Cl. ........................................ 361/68; 324/51; 361/79; 364/480; 364/482
[58] Field of Search ..................................... 361/67–70, 361/79–82, 84, 86, 87; 324/51, 52; 235/151.31; 364/480, 482

[56] References Cited

U.S. PATENT DOCUMENTS

| | | | |
|---|---|---|---|
| 3,569,785 | 3/1971 | Durbeck et al. | 361/80 |
| 3,590,368 | 6/1971 | Esclangon | 361/68 X |
| 3,931,502 | 1/1976 | Kohlas | 361/80 X |
| 3,984,737 | 10/1976 | Okamura et al. | 361/80 |
| 4,079,435 | 3/1978 | Zaslavskaya et al. | 361/68 X |

*Primary Examiner*—Patrick R. Salce
*Attorney, Agent, or Firm*—Robert E. Burns; Emmanuel J. Lobato; Bruce L. Adams

[57] ABSTRACT

A protective relaying system including a protected AC transmission line and detection means for detecting a change in propagation mode of a traveling wave propagating along the transmission line. The transmission line has a pair of line ends and a surge propagation time $\tau$, and the detection means is effective for comparing a value of the traveling wave as it passes one of the line ends at a time $t-\tau$ and a value of the traveling wave as it passes the other of the line ends at a time t after the surge propagation time has elapsed for detecting a change in wave value resulting from a change in wave propagation mode.

5 Claims, 19 Drawing Figures

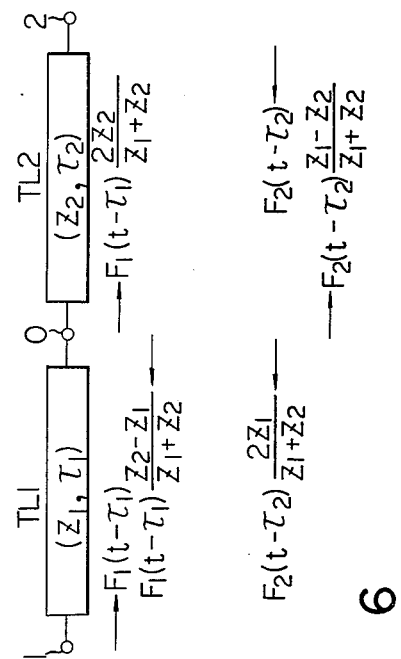
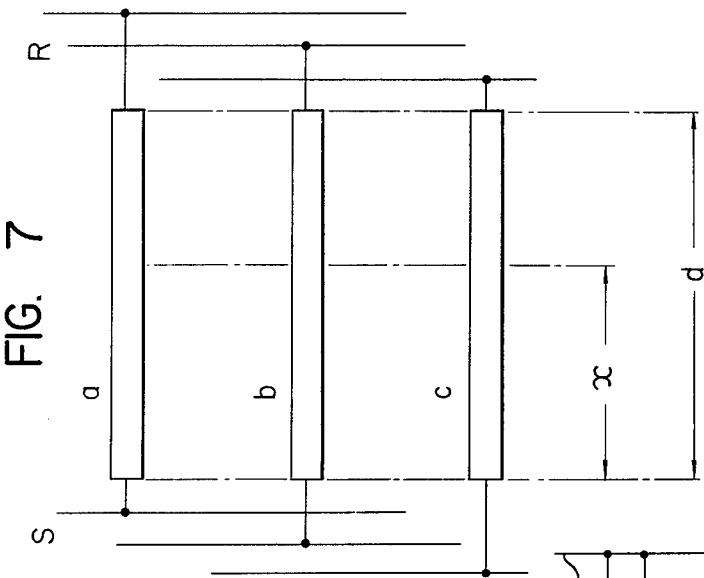
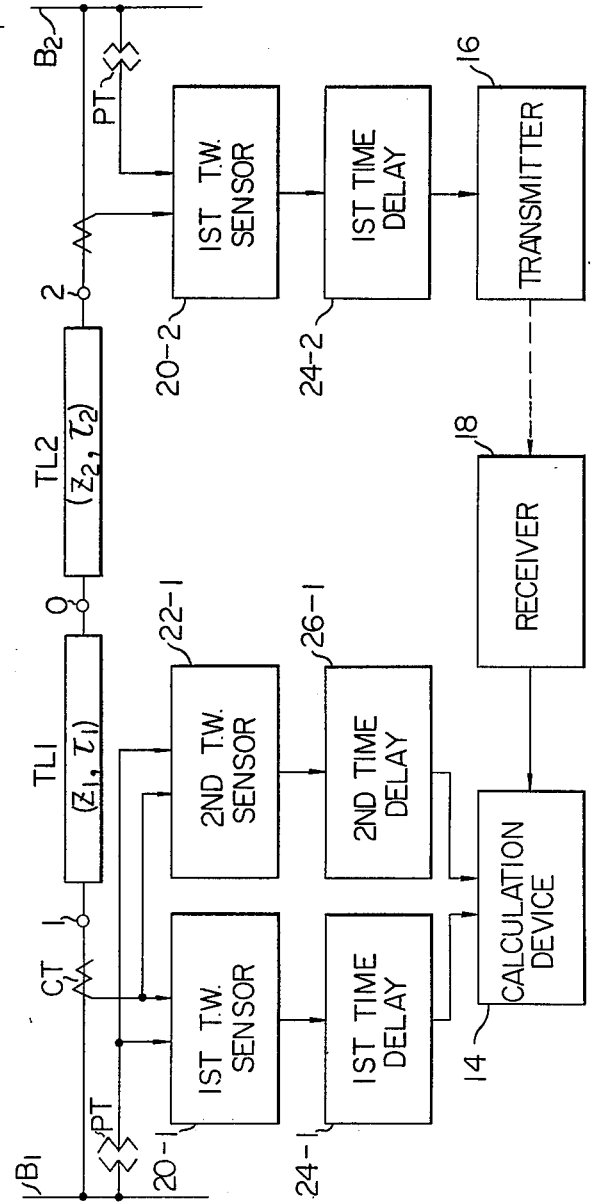
FIG. 7
FIG. 5
FIG. 6

4,183,072

PROTECTIVE RELAYING SYSTEM

GROUND OF THE INVENTION

This invention relates to a protective relaying system for an AC power transmission line utilizing the propagation mode of traveling waves traveling along the line.

Heretofore there have been proposed current differential and phase comparison systems and the like as the fault detection technique employing protective relaying systems for protecting AC power transmission lines. Those conventional systems have been operative on the assumption that the input to protective relaying systems is formed of the fundamental wave, power transmission lines are represented by lumped constant circuits including essentially the line inductance and resistance, and that as far as three-phase transmission lines are concerned, mutual inductances and coupling capacitance between phases are negligible. Therefore during any system fault or upon the occurrence of transients resulting from the operation of an associated switch, such conventional protective relaying systems have often been erroneously operated or inoperative in the transition of the transient to the steady state of transmission lines. Also, because of the detection of the fundamental wave, no fault could be determined until the transients are completed.

In order to avoid the objectionable situations as above described, conventional protective relaying systems have comprised either means for disabling them through the timer or the like for a predetermined time interval required for the transition of the transient to the steady state of transmission lines or filter means for extracting the fundamental wave alone for that predetermined time interval. Those measures have resulted in undesirable circumstances that protective relaying systems increase in operating time.

Accordingly it is an object of the present invention to provide a novel and improved protective relaying system for protecting an AC transmission line at a high speed and also in a transient developed immediately after a fault has occurred on the line.

SUMMARY OF THE INVENTION

The present invention is based upon the fact that power transmission lines are formed of distributed constant circuits alone with the abovementioned assumptions disregarded and that the line fault varies the propagation mode of traveling waves traveling along the lines. The present invention provides a protective relaying system comprising a protected AC transmission line having both ends, a traveling wave traveling at a finite velocity along the transmission line between both ends thereof, and means for detecting a change in porpagation mode of the traveling wave due to a fault occurring on the transmission line whereby the transmission line is protected. The detecting means is disposed at each of both ends of the transmission line and compares a value of the traveling wave as passed through one of the ends with a value of the traveling wave as passed through the other end upon the lapse of a surge propagation time for the transmission line.

In a preferred digital embodiment of the present invention applied to an n-circuit three phase transmission line including at lease two ends R and S, a three-phase voltage and a three-phase current may be sampled at the end S at time point t and the sampled values thereof are subjected to a predetermined mode transformation to provide voltages $f_S^k(t)$ and current $j_S^k$ where $k=1,2,---,3n$ and form $3n$ modes between the ends S and R and having surge propagation times $\tau_k$ and surge impedances $Z_k$ where $k=1,2,---,3n$. Also a three-phase voltage and a three-phase current are sampled at the end R at time point $t+\tau_k$ where $k=1,2,---,3n$ and similarly transformed into voltages $f_R^k(t+\tau_k)$ and currents $j_R^k(t+\tau_k)$. The voltages and currents thus obtained are used to calculate $$\epsilon_k(t) = j_S^k(t) + j_R^k(t+\tau_k) + \frac{1}{Z_k}\{f_S^k(t) - f_R^k(t+\tau_k)\}$$

The calcuated value unequal to zero indicates the occurrence of an internal fault on the associated line section.

In n-terminal m-circuit three phase transmission lines each including n line sections connected together at a branch point x, $3m$ modes may be similarly formed having respective surge impedance $Z_h^k$ and surge propagation time $\tau_h^k$ where $k=1,2,---,n$ and $h=1,2,---,3m$. The h-th mode currents $j_k^h(t-\tau_h^k)$ and $j_k^h(t+\tau_h^k)$ and h-th mode voltages $f_k^h(t-\tau_h^k)$ and $f_k^h(t+\tau_h^k)$ at the terminal K at time points $t-\tau_h^k$ and $t+\tau_h^k$ are derived and used to calculate the h-th mode current $j_{xk}^h(t)$ directed from the branch point X to the terminal K at time point t following $$j_k^h(t+\tau_h^k)+j_k^h(t-\tau_h^k)-\{f_k^h(t+\tau_h^k)-f_k^h(t-\tau_h^k)\}/Z_h^k = -Zj_{xk}^h(t)$$

The $3m$ mode currents $\hat{j}_{xk}^h(t)$ are transformed to three-phase currents $\hat{i}_{xk}^{ap}(t)$, $\hat{i}_{xk}^{bp}(t)$ and $\hat{i}_{xk}^{cp}(t)$ respectively through a transformation inverted from the firstmentioned transformation where $k=1,2,---,n$ and $p=1,2,---,m$. Then $$\epsilon^{ap}(t) = \sum_{k=1}^{n} \hat{i}_{xk}^{ap}(t),\ \epsilon^{bp}(t) = \sum_{k=1}^{n} \hat{i}_{xk}^{bp}(t)\ \text{and}$$

$$\epsilon^{cp}(t) = \sum_{k=1}^{n} \hat{i}_{xk}^{cp}(t)$$

are calculated and a matrix $$\begin{pmatrix} \epsilon^{a1}(t) \\ \epsilon^{b1}(t) \\ \epsilon^{c1}(t) \\ \vdots \\ \epsilon^{am}(t) \\ \epsilon^{bm}(t) \\ \epsilon^{cm}(t) \end{pmatrix}$$

unequal to a zero indicates the occurrence of an internal on the associated line section.

BRIEF DESCRIPTION OF THE DRAWINGS

The present invention will become more readily apparent from the following detailed description taken in conjunction with the accompanying drawings in which:

FIG. 3 is a schematic diagram of a two-terminal single-phase transmission line useful in explaining the propagation mode of a traveling wave traveling along the transmission line;

FIG. 5 is a schematic diagram of a pair of two-terminal single-phase transmission lines having different surge impedances and interconnected at a branch point, useful in explaining the reflection and transmission of traveling waves traveling along the pair of transmission lines;

FIG. 6 is a block diagram of still another embodiment according to the protective relaying system of the present application for protecting the interconnected transmission lines shown in FIG. 5;

FIG. 7 is a schematic diagram of a two-terminal three-phase transmission line represented by a distributed constant model;

DESCRIPTION OF THE PREFERRED EMBODIMENTS

Figure 1:
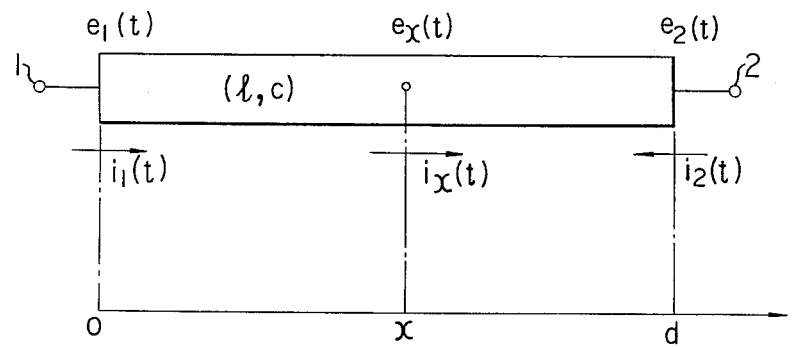
FIG. 1 is a schematic diagram of a single-phase transmission line represented by a distributed constant circuit.

The principles of the present invention have been derived from the concept that power transmission lines are represented by the distributed constant circuit such as shown in FIG. 1. FIG. 1 shows a two-terminal single-phase transmission line represented by a distributed constant circuit having an inductance of $l$ and a capacitance of $c$ per unit length. The line has a length of $d$ defined by a pair of terminals 1 and 2. At time point t, a voltage and a current at the terminal 1 are expressed by $e_1(t)$ and $i_1(t)$ respectively while a voltage and a current at the terminal 2 are expressed by $e_2(t)$ and $i_2(t)$. Also a point on the transmission line spaced away from the terminal 1 by a distance of x has a voltage and a current expressed by $e_x(t)$ and $i_x(t)$ respectively at time point t.

According to the theory of distributed constant circuits, $e_x(t)$ and $i_x(t)$ satisfy the following partial differential equations:

$$-\frac{\partial e_x}{\partial x} = l \frac{\partial i_x}{\partial t} \tag{1}$$

and $$-\frac{\partial i_x}{\partial x} = c \frac{\partial e_x}{\partial t} \tag{2}$$

As well known, the equations (1) and (2) are satisfied by $$e_x(t) = F(t - \frac{x}{v}) + f(t + \frac{x}{v})$$

and $$i_x(t) = \frac{1}{Z} \{F(t - \frac{x}{v}) - f(t + \frac{x}{v})\}$$

where v designates a surge propagation velocity expressed by $v = 1/\sqrt{lc}$ while Z designates a surge impedance of the line expressed by $Z = \sqrt{l/c}$. Also $$F(t - \frac{x}{v})$$

represents a traveling wave traveling along the transmission line from the terminal 1 toward the terminal 2 and is expressed by $$e_x(t) + Zi_x(t) = 2F(t - \frac{x}{v}). \tag{3}$$

Similarly $f(t + \frac{x}{v})$ represents a traveling wave traveling along the same line from the terminal 2 toward the terminal 1 and is expressed by $$e_x(t) - Zi_x(t) = 2f(t + \frac{x}{v}). \tag{4}$$

Substituting values of the voltage and current at the terminals 1 and 2 into the expression (3) yields $$e_1(t-\tau) + Zi_1(t-\tau) = 2F(t-\tau) \tag{5}$$

and $$e_2(t) - Zi_2(t) = 2F(t-\tau) \tag{6}$$

where $\tau$ designates a surge propagation time and is expressed by $\tau = d/v$. Similarly the expression (4) is deduced to $$e_1(t) - Zi_1(t) = 2f(t) \tag{7}$$

and $$e_2(t-\tau)+Zi_2(t-\tau)=2f(t) \qquad (8)$$

In the expressions (5) through (8) it is assumed that the $i_1$ and $i_2$ have the positive sign when each current enters the line through the associated terminal.

From the expressions (5), (6), (7) and (8) it is seen that the voltages and currents at the terminals 1 and 2 meet the relationship expressed by $$e_1(t-\tau)+Zi_1(t-\tau)=e_2(t)-Zi_2(t) \qquad (9)$$

and $$e_1(t)-Zi_1(t)=e_2(t-\tau)+Zi_2(t-\tau). \qquad (10)$$

The relationship shown by the expressions (9) and (10) are always met unless an abnormal state such as a fault occurs within the transmission line. That is, the relationship is not satisfied only when a fault occurs on the transmission line. Thus the relationship (9) and (10) is effective for determining any internal fault on the transmission line for protective purposes. More specifically, by dividing the expression (9) by the Z, one can define an electrical quantily $\epsilon_1(t)$ expressed by $$\epsilon_1(t) = \frac{1}{Z} e_1(t-\tau) + i_1(t-\tau) \qquad (11)$$

$$- \{\frac{1}{Z} e_2(t) - i_2(t)\}.$$

From the expression (11) it is seen that, if an internal fault exists on the transmission line between the terminals 1 and 2 that $$\epsilon_1(t) \neq 0 \qquad (12)$$

is obtained. On the other hand, if the line is sound between the terminals 1 and 2 then $$\epsilon_1(t)=0 \qquad (13)$$

Therefore the $\epsilon_1(t)$ expressed by the expression (11) can be used to find if an internal fault occurs on the transmission line.

As the $\epsilon_1(t)$ has the dimension of current, a corresponding electrical quantity of $\epsilon_2(t)$ having the dimension of voltage may be given by $$\epsilon_2(t)=e_1(t-\tau)+Zi_1(t-\tau_1)-\{e_2(t)-Zi_2(t)\}. \qquad (14)$$

That is, the expression (14) is deduced by multiplying the expression (11) by the impedance Z. It will readily be understood that the expression (14) can be used to determine if an internal fault occur on the transmission line.

Figure 2:
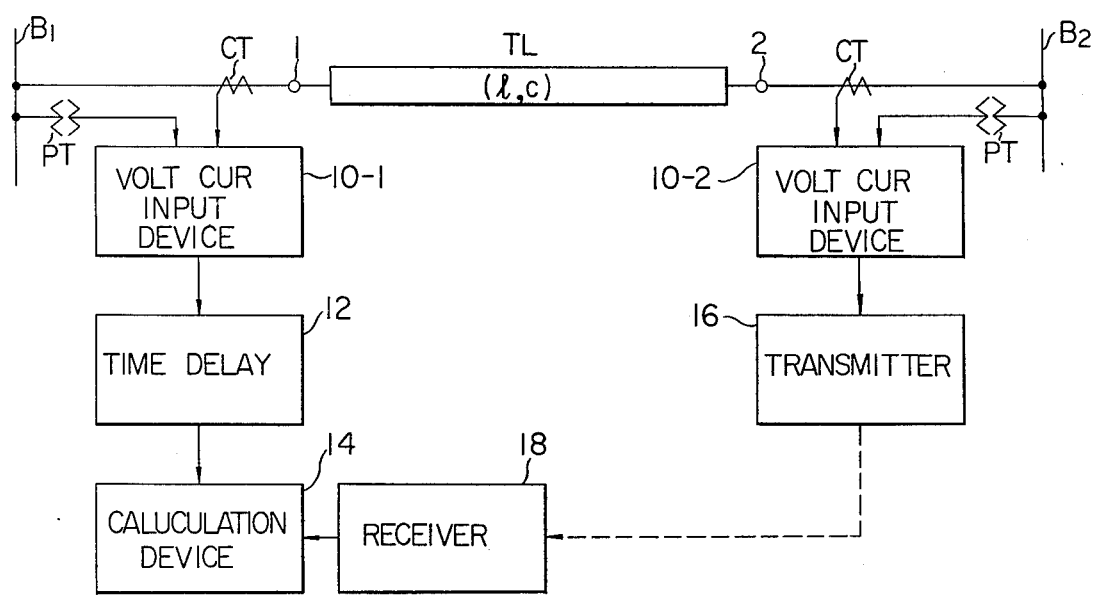
FIG. 2 is a block diagram of one embodiment according to the protective relaying system of the present invention.

FIG. 2 shows a protective relaying system constructed in accordance of the principles of the present invention as above described in conjunction with FIG. 1. The arrangement illustrated comprises a transmission line TL including a pair of terminals 1 and 2, and a pair of buses B1 and B2 connected to the terminals 1 and 2 respectively. On the side of the terminal 1, a current transformer CT is coupled to a lead connecting the bus B1 to the terminal 1 to measure the system current and also a potential transformer PT is coupled to the bus B1 to measure the system voltage. Both transformers CT and PT are connected to a voltage-current input device 10-1 subsequently connected to a time delay circuit 12 having a delay time of $\tau$. The delay circuit 12 is connected to a calculation device 14.

On the other hand, another current transformer CT, another potential transformer PT are similarly coupled to the terminal 2 and the bus B2 respectively and connected together to another voltage-current input device 10-2 that is, in turn, connected to a transmitter 16. The transmitter 16 is electrically coupled to a receiver 18 subsequently connected to the calculation circuit 14.

The arrangement of FIG. 2 is operated as follows: At time point $(t-\tau)$, the transformers CT and PT on the side of terminal 1 measure a current $i_1(t-\tau)$ and a voltage $e_1(t-\tau)$ respectively and supply them to the current-voltage input device 10-1. The input device 10 includes actually an analog-to-digital converter circuit (not shown) in which the measured analog current and voltage are converted to corresponding digital current and voltage respectively. The digital current and voltage from the input device 10-1 are delivered to the delay circuit 12 to be delayed with a delay time of $\tau$. The delayed current and voltage are applied to the calculation device 14.

On the other hand, the current and potential transformers CT and PT on the side of the terminal 2 measure a current $i_2(t)$ and a voltage $e_2(t)$ at time point t. The current-voltage input device 10-2 on the side of the terminal 2 processes the measured current and voltage in the same manner as the input device 10-1. Then the processed current and voltage are applied to the transmitter 16 which, in turn, transmits them to the receiver 18.

In the calculation device 14, the current and voltage resulting from the terminal 1 and applied thereto through the delay circuit 12 and those resulting from the terminal 2 and applied thereto through the transmitter 16 and the receiver 18 are used to effect a calculation following the expression (11). When a calculated value of $\epsilon_1(t)$ satisfies the expression (12) or is not equal to a zero, the calculation device 14 delivers a command tripping signal to an associated circuit breaker (not shown) for protective purposes.

As the expression (12) that indicates the occurrence of an internal fault is deduced from the expressions (9) and (10), the present invention determines the occurrence of an internal fault on the basis of the expressions (9) and (10). The physical meaning of those expression will now be described.

The left hand side of the expression (9) describes a traveling wave entering the transmission line TL through terminal 1 at time point $(t-\tau)$ in terms of the dimension of voltage on the one hand and the right hand side thereof describes a traveling wave leaving from the transmission line TL through the terminal 2 at time point t in terms of the dimension of voltage on the other hand. By comparing both sides of the expression (9) with each other, it will readily be understood that the traveling wave traveling along the transmission line from the terminal 1 toward the terminal 2 at time point $(t-\tau)$ reaches the terminal 2 after the lapse of a time interval $\tau$. Thus the traveling wave has a propagation time of $\tau$ defined by $= \tau d/v$ where d designates a distance between the terminals 1 and 2 and v designates a surge propagation velocity as above described.

Similarly the expression (10) describes that a traveling wave traveling along the transmission line TL from the terminal 2 toward the terminal 1 at time point $(t-\tau)$ reaches the terminal 1 after the lapse of the time interval $\tau$.

It is to be understood that the travel of the traveling wave along the transmission line as above described is accomplished in the absence of an internal fault between the terminals 1 and 2 and that the occurrence of an internal fault causes a variation in propagation mode of the traveling waves so that the expressions (9) and (10) are not fulfilled.

From the foregoing it is seen that the present invention perceives the propagation mode of the traveling waves as above described thereby to protect transmission lines. The expression (9) is utilized by the arrangement of FIG. 2 including the delay circuit 12 disposed on the side of the terminal 1 but the utilization of the expression (10) requires to dispose the delay circuit 12 on the side of the terminal 2.

The delay circuit 12 may be omitted with the calculation device 14 having the storage function.

Also the present invention will now be described to be applied to a multiple-terminal transmission line. In multiple-terminal single-phase transmission lines the Kirchhoff's first law is applied to all currents entering and leaving every branch points thereon.

FIG. 3 shows a pair of two-terminal single-phase transmission lines TL1 and TL2 interconnected at a branch point 0 and having respective terminals 1 and 2. In order to illustrate the relationship between traveling waves and the Kirchhoff's first law, the transmission line TL1 has a distance $d_1$ between the terminal 1 and the branch point 0 and a surge propagation time $\tau_1$ for which a traveling wave travels or propagates along the line from the terminal 1 to the branch point 0 while the transmission line TL2 has a distance $d_2$ between the terminal 2 and the branch point 0 and a surge propagation time $\tau_2$ for which a traveling wave travels along the line from the terminal 2 to the branch point 0. Thus the surge propagation times $\tau_1$ and $\tau_2$ are expressed by $\tau_1 = d_1/v$ and $\tau_2 = d_2/v$ respectively. Assuming that at time point t, $i_{01}(t)$ and $i_{02}(t)$ designate currents flowing from the branch point 0 toward the terminals 1 and 2 respectively and $e_0(t)$ designates a voltage at the branch point 0.

$$e_0(t) - Zi_{01}(t) = 2F_1(t - \tau_1) \qquad (15)$$

$$e_0(t) + Zi_{01}(t) = 2f_1(t + \tau_1) \qquad (16)$$

$$e_0(t) - Zi_{02}(t) = 2F_2(t - \tau_2) \qquad (17)$$

and $$e_0(t) + Zi_{02}(t) = 2f_2(t + \tau_2) \qquad (18)$$

are satisfied by $i_{01}(t)$, $i_{02}(t)$ and $e_0(t)$ as the expressions (6) and (8). Here $F_1$ designates a traveling wave traveling along the line TL1 from the terminal 1 toward the branch point 0, $F_2$ a traveling wave traveling along the line TL2 from the terminal 2 toward the branch point 0, $f_1$ a traveling wave traveling along the line TL1 from the branch point 0 toward the terminal 1, and $f_2$ designates a traveling wave traveling along the line TL2 from the branch point 0 toward the terminal 2.

From the expressions (15) through (18) one can obtain the currents $i_{01}(t)$ and $i_{02}(t)$ at the branch point 0 and at a time point t expressed respectively by $$i_{01}(t) = \frac{2}{Z}\{f_1(t + \tau_1) - F_1(t - \tau_1)\}$$

and $$i_{02}(t) = \frac{2}{Z}\{f_2(t + \tau_2) - F_2(t - \tau_2)\}.$$

According to the Kirchhoff's first law, $$i_{01}(t) + i_{02}(t) = 0$$

must be held. As a result, the following identity is obtained:

$$F_1(t - \tau_1) + F_2(t - \tau_2) = f_1(t + \tau_1) + f_2(t + \tau_2) \qquad (19).$$

The identity (19) describes that the sum of the traveling waves $F_1(t - \tau_1)$ and $F_2(t - \tau_2)$ entering the transmission lines TL1 and TL2 through the terminals 1 and 2 at time points $(t - \tau_1)$ and $(t - \tau_2)$ respectively is equal to the sum of the traveling waves $f_1(t + \tau_1)$ and $f_2(t + \tau_2)$ leaving the terminals 1 and 2 at time points $(t + \tau_1)$ and $(t + \tau_2)$ respectively. Since the identity (19) is always fulfilled unless an internal fault occurs between the terminals 1 and 2, the presence or the absence of an internal fault can be determined by whether or not the identity (19) is held.

Figure 4:
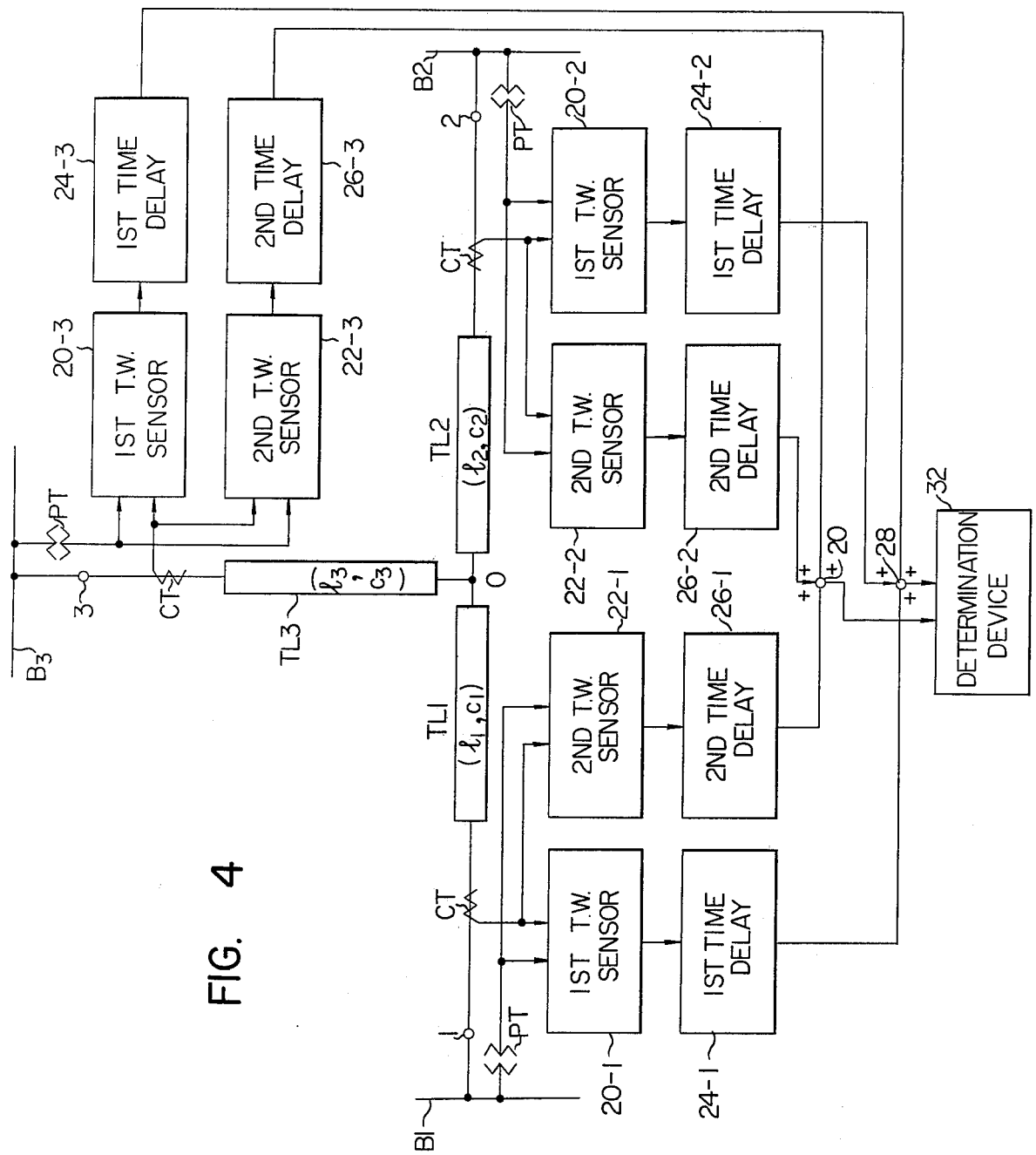
FIG. 4 is a block diagram of another embodiment according to the protective relaying system of the present invention applied to a three-terminal single-phase transmission line.

FIG. 4 shows a modification of the present invention operative in accordance with the principles as described in conjunction with FIG. 3 to protect a three-terminal single-phase transmission line. In FIG. 4 three single-phase transmission line sections TL1, TL2 and TL3 are connected together to a branch point 0 and include respectively terminals 1, 2 and 3 to form a three-terminal single-phase transmission line. Each of the terminals 1, 2, and 3 has a bus B1, B2 or B3, a current transformer CT and a potential transformer PT electrically connected thereto in the similar manner as above described in conjunction with FIG. 2.

On each of the terminal sides, the current and potential transformers CT and PT respectively are connected to a first and a second traveling wave detectors 20 and 22 respectively which are, in turn, connected to respective time delay circuits 24 and 26. The first detector 20 detects a traveling wave entering the transmission line from the associated terminal while the second detector 22 detects a traveling wave leaving the transmission line through the associated terminal. Those detectors and time delay circuits operatively associated with each terminal are designated by the reference numerals identifying them and suffixed with the reference numeral designating each terminal. For example, the first detector operatively associated with the terminal 1 is designated by 20-1 and the time delay circuits operatively associated with the terminal 3 are designated by 24-3 and 26-3 respectively. The time delay circuits 24-1, 24-2 and 24-3 are operative to impart delay times $T + \tau_1$, $T + \tau_2$ and $T + \tau_3$ to outputs from the first traveling-wave detectors 20-1, 20-2 and 20-3 respectively while the time delay circuits 26-1, 26-2 and 26-3 are operative to impart delay times $T - \tau_1$, $T - \tau_2$ and $T - \tau_3$ to output from the second traveling wave detectors 22-1, 22-2 and 22-3 respectively where $\tau_3$ designates a surge propagation time between the terminal 3 and the branch point 0 and T is a constant sufficiently larger than $\tau_1$, $\tau_2$ and $\tau_3$, the first two of which have been defined in the arrangement of FIG. 3.

The first time delay circuits 24-1, 24-2 and 24-3 are connected together to a first summation point 28 and the second time delay circuits 26-1, 26-2 and 26-3 are similarly connected to a second summation point 30.

Then both summation points 28 and 30 are connected to a determination device 32.

In operation, the first traveling-wave detectors 20-1, 20-2 and 20-3 receive outputs from the associated current and potential transformers CT and PT respectively to detect individual traveling waves $F_1(t-\tau_1)$, $F_2(t-\tau_2)$ and $F_3(t-\tau_3)$ entering the transmission line sections TL1, T2 and T3 at time points $t-\tau_1$, $t-\tau_2$ and $t-\tau_3$ respectively. Similarly, the second traveling wave detector 22-1, 22-2 and 22-3 detect traveling waves $f_1(t+\tau_1)$, $f_2(t+\tau_2)$ and $f_3(t+\tau_3)$ leaving the line sections at time points $t+\tau_1$, $t+\tau_2$ and $t+\tau_3$ respectively.

In other words, the traveling wave $F_i(t-\tau_1)$ where $i=1, 2, 3$ and the traveling wave $f_i(t+\tau_1)$ where $i=1, 2, 3$ are provided by substituting the outputs from the current and potential transformers and the surge impedance Z into the lefthand sides of the expressions (3) and (4).

Then the detected traveling waves from the first detectors 20-1, 20-2 and 20-3 are applied to the time delay circuits 24-1, 24-2 and 24-3 where the waves are delayed with different delay times $T+\tau_1$, $T+\tau_2$ and $T+\tau_3$ respectively. Thereafter the differently delayed waves are supplied together to the first summation point 28 to form a signal expressed by $$F_1(t-\tau_1)+F_2(t-\tau_2)+F_3(t-\tau_3).$$

On the other hand, the detected traveling waves from the second detectors 22-1, 22-2 and 22-3 are similarly delayed with different delay times $T-\tau_1$, $T-\tau_2$ and $T-\tau_3$ by the time delay circuits 26-1, 26-2 and 26-3 respectively and then collected at the second summation point 30 to form a signal expressed by $$f_1(t-\tau_1)+f_2(t+\tau_2)+f_3(t-\tau_3).$$

The purpose of the time delay circuits 24-1, 24-2, 24-3, 26-1, 26-2 and 26-3 are to impart different delay times $T+\tau_1$, $T+\tau_2$, $T+\tau_3$, $T-\tau_1$, $T-\tau_2$ and $T-\tau_3$ to the traveling waves detected at different time points $t-\tau_1$, $t-\tau_2$, $t-\tau_3$, $t+\tau_1$, $t-\tau_2$ and $t+\tau_3$ thereby to effect their comparision at the same time point $t+T$.

Both signals from the first and second summation points 28 and 30 are applied to the determination device 32 where the signals are compared with each other. If the signals are different from each other as determined by the device 32 then a tripping signal is delivered to a circuit breaker or breakers (not shown) for the transmission line for protective purposes as in the arrangement of FIG. 2.

While the three-terminal single-phase transmission line has been described in conjunction with FIG. 4 it is to be understood that the present invention is equally applicable to single-phase transmission lines having four or more terminals. For n-terminal single-phase transmission lines, the determination device 32 is required only to find an identity.

$$\sum_{k=1}^{n} F_k(t-\tau_k) = \sum_{k=1}^{n} f_k(t+\tau_k) \quad (19')$$

where $\tau_k$ designates a surge propagation time between the k-th terminal and the branch point 0, $F_k(t-\tau_k)$ a traveling wave entering an associated line section through a terminal k at time point $t-\tau_k$ and $f_k(t+\tau_k)$ designates a traveling wave leaving that line section through the terminal k at time point $t+\tau_k$.

Under these circumstances, the current and potential transformers may be operatively coupled to both summation points through the first and second traveling wave detectors and time delay circuits therefor having predetermined delay times.

While the present invention has been illustrated and described in conjunction with single-phase transmission lines having the constant surge impedance it is to be understood that it is equally applicable to single phase transmission lines having different surge impedances and connected together at a branch point.

It is well known that, with a pair of single-phase transmission lines having different surge impedances and interconnected at a branch point, a traveling wave traveling along each of the lines is reflected from the branch point.

FIG. 5 shows a two terminal-single phase transmission line including a pair of interconnected line sections having different surge impedances for a purpose of explaining the reflection and transmission of a traveling wave traveling along the line. In FIG. 5, a single-phase transmission line includes a pair of line sections interconnected at a branch point 0. One of the line sections labelled TL1 includes a terminal 1 and has a surge impedance Z1 and a surge propagation time $\tau_1$ between the terminal 1 and the branch point 0 and the other line section TL2 includes a terminal 2 and has a surge impedance $Z_2$ different from the $Z_1$ and a surge propagation time $\tau_2$ between the terminal 2 and the branch point 0 different from the $\tau_1$.

It is now assumed that a traveling wave $F_1(t-\tau_1)$ enters the line section TL1 through the terminal 1 at time point $t-\tau_1$ while another traveling wave $F_2(t-\tau_2)$ enters the line section TL2 through the terminal 2 at time point $t-\tau_2$. Under the assumed condition, the traveling wave $F_1(t-\tau_1)$ reaches the branch point 0 from which one portion of the wave is reflected toward the terminal 1. The remaining portion of the traveling wave continues to travel along the line section TL2. That is, it is transmitted along the line section TL2. The theory of transmission line transients teaches that, at the branch point 0 the traveling wave is divided into a transmitted wave component expressed by $$F_1(t-\tau_1)\frac{2Z_2}{Z_1+Z_2}$$

and a reflected wave component expressed by $$F_1(t-\tau_1)\frac{Z_2-Z_1}{Z_1+Z_2}.$$

Similarly when the traveling wave $F_2(t-\tau_2)$ traveling along the line section TL2 reaches the branch point 0, it is divided into a transmitted wave component expressed by $$F_2(t-\tau_2)\frac{2Z_1}{Z_1+Z_2}$$

and a reflected wave component expressed by $$F_2(t - \tau_2)\frac{Z_1 - Z_2}{Z_1 + Z_2}.$$

Therefore a traveling wave $f_1(t+\tau_1)$ leaving the line section TL1 through the terminal 1 at time point $t+\tau_1$ can be expressed by $$f_1(t + \tau_1) = F_1(t - \tau_1)\frac{Z_2 - Z_1}{Z_1 + Z_2} \qquad (20)$$
$$+ F_2(t - \tau_2)\frac{2Z_1}{Z_1 + Z_2}.$$

Similarly a traveling wave expressed by $$f_2(t + \tau_2) = F_2(t - \tau_2)\frac{Z_1 - Z_2}{Z_1 + Z_2} \qquad (21)$$
$$+ F_1(t - \tau_1)\frac{2Z_2}{Z_1 + Z_2}.$$

leaves the line section TL2 through the terminal 2 at time point $t+\tau_2$.

The above expressions (20) and (21) are always held unless an internal fault occurs between the terminals 1 and 2.

In FIG. 6 wherein like reference numerals designate the components identical to those shown in FIGS. 2 and 4 there is illustrated another modification of the present invention suitable for protecting a transmission line by utilizing the expression (20). As in the arrangement of FIG. 4, the first traveling-wave detedtor 20-1 is operative to detect a traveling wave $F_1(t-\tau_1)$ entering the line section TL1 from the terminal 1 at time point $t-\tau_1$ while the second traveling-wave detector 22-1 is operative to detect a traveling-wave $f_1(t+\tau_1)$ leaving the line section TL1 through the terminal 1 at time point $t+\tau_1$. On the side of the terminal 2, only the first traveling-wave detector 20-2 is disposed to detect a traveling wave $F_2(t-\tau_2)$ entering the line section TL2 through that terminal at time point $t-\tau_2$ without the second detector for detecting a traveling wave leaving the line section through the terminal 2. The traveling wave detectors 20-1, 22-1 and 20-2 are connected to the respective time delay circuits 24-1, 26-1 and 24-2 for imparting to inputs applied thereto different delay times $T+\tau_1$, $T+\tau_2$, $T-\tau_1$ respectively where $T$, $\tau_1$, $\tau_2$ have been defined in the arrangement of FIG. 4.

As in the arrangement of FIG. 2, the time delay circuits 24-1 and 26-1 on the side of the terminal 1 are connected to the calculation device 14 and the time delay circuit 20-2 is coupled to the calculation device 14 through the transmitter 16 connected to the same and the receiver 18 coupled to the transmitter 16 and connected to the calculation device 14.

Accordingly, the calculation device 14 calculates the expression (20) by using the outputs $F_1(t-\tau_1)$ and $f_1(t+\tau_2)$ from the time delay circuits 24-1 and 26-1 and the output $F_2(t-\tau_2)$ from the receiver 18 delayed as above described. Thus this calculation is effected at time point $t+T$.

When the calculation device 14 finds that the expression (20) is satisfied, it determines that the transmission line is sound. Otherwise the calculation device 14 determines that an internal fault has occurred on the transmission line resulting in a tripping signal being delivered to an associated circuit breaker (not shown).

It will readily be understood that the calculation is effected such that values of the traveling waves $F_1(t-\tau_1)$ and $f_2(t-\tau_2)$ on the right hand side of the expression (20) is found by substituting both the outputs from the current and potential transformers CT and PT on the side of the terminal 1 and values of the surge impedances $Z_1$ and $Z_2$ into the lefthand side of the expression (3), and a value of the traveling wave $f_1(t+\tau_1)$ on the left hand side of the expression (20) is similarly found from the expression (4). The surge impedances $Z_1$ and $Z_2$ are preset in the calculation device 14.

While the arrangement of FIG. 6 is operative with the expression (20) it is to be understood that the arrangement may readily be modified to be operative with the expression (21).

While the present invention has been illustrated and described in conjunction with single-phase transmission lines it is also to be noted that the same can be extended to be equally applicable to the protection of three-phase transmission lines. This is because the occurrence of an internal faults on any three-phase transmission line causes a variation in propagation mode of a traveling wave traveling therealong.

A single-circuit two-terminal three-phase transmission line schematically shown in FIG. 7 comprises three conductors representing three phases a, b and c, an S terminal disposed at one end of the line and an R terminal disposed at the other end thereof with the conductors having equal distances of d between the S and R terminals. The transmission line is represented by a three-phase distributed constant circuit including an impedance expressed by an inductance matrix $[Z]$ and an admittance expressed by an capacitance matrix $[Y]$ per unit length thereof. At time point t a three-phase voltage $[e]$ and a three-phase current $[i]$ at a point spaced away from the S terminals by a distance x satisfy the following partial differential equations:

$$-\frac{\partial[e]}{\partial x} = [Z]\frac{\partial[i]}{\partial t} \qquad (1')$$

and $$-\frac{\partial[i]}{\partial x} = [Y]\frac{\partial[e]}{\partial t} \qquad (2')$$

where $$[e]=[e^a, e^b, e^c]^t$$

and $$[i]=[i^a, i^b, i^c]^t.$$

The notation [t] means the transposition of a matrix. Phase voltages are designated by $e^a$, $e^b$ and $e^c$, while phase currents are designated by $i^a$, $i^b$ and $i^c$. The inductance matrix $[Z]$ is a symmetric matrix including three rows and three columns while the capacitance matrix $[Y]$ is also a symmetric matrix including three rows and three columns. The matrix $[Z]$ includes components which are functions of self-inductances on the respective phases and mutual conductances while the matrix $[Y]$ includes components which are functions of self-capacitance on the respective phases and coupling capacitances between the phases.

In order to transform the matrices $[e]$ and $[i]$ from the phase region to the mode region, linear transformations $[S]$ and $[Q]$ are conducted with them as expressed by $$[e]=[S][f] \qquad (22)$$

and $$[i] = [Q][j]. \quad (23)$$

Through the transformations by the above expressions, the partial differential equations (1') and (2') are deduced to $$-\frac{\partial [f]}{\partial x} = [S]^{-1}[Z][Q]\frac{\partial [j]}{\partial t} \quad (1'\text{a})$$

and $$-\frac{\partial [j]}{\partial x} = [Q]^{-1}[Y][S]\frac{\partial [f]}{\partial t}. \quad (2'\text{a})$$

According to the theory of linear transformations, the [S] and [Q] can be properly selected to form diagonal matrices expressed by $$[S]^{-1}[Z][Q] = \begin{bmatrix} l_1 & 0 & 0 \\ 0 & l_2 & 0 \\ 0 & 0 & l_3 \end{bmatrix}$$

and $$[Q]^{-1}[Y][S] = \begin{bmatrix} c_1 & 0 & 0 \\ 0 & c_2 & 0 \\ 0 & 0 & c_3 \end{bmatrix}$$

Accordingly, in the mode region, the partial differential equation (1') and (2') can be reduced to $$-\frac{\partial f^k}{\partial x} = l_k \frac{\partial j^k}{\partial t} \quad (24)$$

and $$-\frac{\partial j^k}{\partial x} = c_k \frac{\partial f^k}{\partial t} \quad (26)$$

where $k = 1, 2, 3$.

The partial differential equations (24) and (26) have the following solution in three mode regions:

$$f^k = F_k(t - \frac{x}{v_k}) + G_k(t + \frac{x}{v_k}) \quad (26)$$

and $$j^k = \frac{1}{Z_k}\{F_k(t - \frac{x}{v_k}) - G_k(t + \frac{x}{v_k})\} \quad (27)$$

where $k = 1, 2, 3$. In the above expressions (26) and (27), $Z_k$ designates a surge impedance defined by the square root of the quotient of an inductance $l_k$ divided by a capacitance $c_k$ and $v_k$ designates a surge propagation velocity defined by the reciprocal of the square root of the product of the $l_k$ and $c_k$. Also $F_k$ designates a traveling wave directed from the S terminal to the R terminal and $G_k$ designates a traveling wave directed from the terminal R to the terminal S.

Eliminating $$F_k(t - \frac{x}{v_k})$$

from (26) and (27) gives $$f^k - Z_k j^k = 2G_k(t + \frac{x}{v_x}). \quad (28)$$

As a result, $$f_S^k(t+\tau_k) - Z_k j_S^k(t+\tau_k) = f_R^k(t) + Z_k j_R^k(t) \quad (29)$$

is held at the S and R terminals where $\tau_k$ designates a surge propagation time defined by $\tau_k = d/v_k$. In this case, the electrical quantities $j_R^k$ and $j_S^k$ corresponding to the current are positive when they enter the transmission line through the R or S terminal:

Therefore, by defining $\epsilon_k(t)$ where $k = 1, 2, 3$ by $$\epsilon_k(t) = f_S^k(t + \tau_k) + f_R^k(t) - \quad (30)$$

$$\{f_S^k(t + \tau_k) - f_R^k(t)\} / Z_x$$

$$[\epsilon_1 \; \epsilon_2 \; \epsilon_3]^t = [\phi]$$

is always fulfilled unless a fault occurs within the transmission line where $[\phi]$ designates a zero vector. The occurrence of a fault within the line results in $$[\epsilon_1 \epsilon_2 \epsilon_3]^t = [\phi].$$

Accordingly, the expression (28) can be effectively used to find an internal fault.

Since the righthand side of the expression (30) includes electrical quantities concerning the mode regions, those quantities can be calculated from corresponding electrical quantities concerning the phase region through the linear transformations inverse from those described by the expressions (22) and (23). That is, by substituting $$\begin{bmatrix} f^1 \\ f^2 \\ f^3 \end{bmatrix} = [S]^{-1} \begin{bmatrix} e^a \\ e^b \\ e^c \end{bmatrix}$$

and $$\begin{bmatrix} j^1 \\ j^2 \\ j^3 \end{bmatrix} = [Q]^{-1} \begin{bmatrix} i^a \\ i^b \\ i^c \end{bmatrix}$$

describing the inverse transformations into the expression (30), the $\epsilon_k(t)$ in each mode can be obtained. This is because the [S] and [Q] are constants inherent to the particular three-phase transmission line.

The physical meaning of the expressions (26) through (29) will now be described. As above described, the $F_k$ appearing in the expressions (26) and (27) designates a traveling wave traveling from the S to the R terminal and the $G_k$ appearing in the same expressions designates a traveling wave traveling from the R to the S terminal. The expression (29) describes that, in the absence of an internal fault, the traveling wave traveling from the R to the S terminal reaches the S terminal upon the surge propagation time $\tau_k$ having elapsed. On the other hand, the traveling wave traveling from the S to the R terminal meets the relationship expressed by $$f_S^k(t) + Z j_S^k(t) = f_R^k(t+\tau_k) - Z j_R^k(t+\tau_k)$$

at the S and R terminals. This is because $$f^k + Z j^k = 2F_k(t - \frac{x}{v_k})$$

is obtained by eliminating $G_k$ from the expressions (26) and (27). In this case $$\epsilon_k(t) = \quad (31)$$

-continued
$$f_S^k(t) + f_R^k(t + \tau_k) - \{f_R^k(t + \tau_k) - f_S^k(t)\}/Z_k$$

where $k = 1, 2, 3$ can be defined as the expression (28). This expression (31) can be used to determine whether or not an internal fault occurs.

Thus the principles of the present invention have been derived in conjunction with single circuit three phase transmission lines. It will be understood that the principles of the present invention can be similarly derived in conjunction with multiple-circuit three-phase transmission lines. As an example, a double circuit two-terminal three-phase transmission line shown in FIG. 8 will now be described. The transmission line is expressed by a pair of three-phase distributed constant circuits each shown by three conductors $a_1$, $b_1$ or $a_2$, $b_2$ and $c_2$ and including an inductance matrix [Z] and a capacitance matrix [Y] per unit length. As in the arrangement of FIG. 7, a three-phase voltage [e] and a three-phase current [i] at a point spaced away from the S terminal by a distance x at time point t statisfy the following partial differential equations:

$$-\frac{\partial [e]}{\partial x} = [Z] \frac{\partial [i]}{\partial t} \tag{1''}$$

and $$\frac{\partial [i]}{\partial x} = [Y] \frac{\partial [e]}{\partial t} \tag{2''}$$

where $$[e] = [e^{a1}, e^{b1}, e^{c1}, e^{a2}, e^{b2}, e^{c2}]^t$$

and $$[i] = [i^{a1}, i^{b1}, i^{c1}, i^{a2}, i^{b2}, i^{c2}]^t.$$

That is, [e] and [i] are transposed matrices from $$[e] = [e^{a1}, e^{b1}, e^{c1}, e^{a2}, e^{b2}, e^{c2}]$$

and $$[i] = [i^{a1}, i^{b1}, i^{c1}, i^{a2}, i^{b2}, i^{c2}]$$

respectively. Also the matrices [Z] and [Y] are symmetric and each include six rows and six columns.

By conducting linear transformations [S] and [Q] with [e] and [i] as expressed by $$[e] = [S][f] \tag{32}$$

and $$[i] = [Q][j] \tag{33}$$

the phase region is transformed to the mode region. That is, the partial differential equations (1'') and (2'') are reduced to $$-\frac{\partial [f]}{\partial x} = [S]^{-1} [Z][Q] \frac{\partial [j]}{\partial t}$$

and $$-\frac{\partial [j]}{\partial x} = [Q]^{-1} [Y][S] \frac{\partial [f]}{\partial t}$$

respectively. As in the partial differential equations (1'a) and (2'a), the transformations [S] and [Q] can be properly selected to obtain symmetric matrices $$[S]^{-1}[Z][Q] = \begin{bmatrix} l_1 & & & & & \phi \\ & l_2 & & & & \\ & & l_3 & & & \\ & & & l_4 & & \\ & & & & l_5 & \\ \phi & & & & & l_6 \end{bmatrix}$$

and $$[Q]^{-1}[Y][S] = \begin{bmatrix} c_1 & & & & & \phi \\ & c_2 & & & & \\ & & c_3 & & & \\ & & & c_4 & & \\ & & & & c_5 & \\ \phi & & & & & c_6 \end{bmatrix}$$

Therefore, in the mode region, the partial differential equations (1'') and (2'') are reduced respectively to $$-\frac{\partial f^k}{\partial x} = l_k \frac{\partial j^k}{\partial t} \tag{34}$$

and $$-\frac{\partial j^k}{\partial x} = c_k \frac{\partial f^k}{\partial t} \tag{32)(35}$$

where $k = 1, 2, \ldots, 6$.

Those partial differential equations (34) and (35) have solutions in the six modes expressed by $$f^k = F_k(t - \frac{x}{v_k}) + G_k(t + \frac{x}{v_k}) \tag{36}$$

and $$j^k = \frac{1}{Z_k} \{ F_k(t - \frac{x}{v_k}) - G_k(t + \frac{x}{v_k}) \} \tag{37}$$

where $k = 1, 2, \ldots, 6$. In the above expressions, $Z_k$ and $v_k$ are defined by $Z_k = \sqrt{l_k/c_k}$ and $v_k = 1/\sqrt{l_k c_k}$ respectively where $l_k$ and $c_k$ designate an inductance and a capacitance per unit length of the k-th mode circuit as above described. The expressions (36) and (37) easily give $$f^k - Z_k j^k = 2G_k(t + \frac{x}{v_k}).$$

Therefore
$$f_S^k(t + \tau_k) - Z_k j_S^k(t + \tau_k) = f_R^k(t) + Z_k j_R^k(t)$$

is satisfied at the S and R terminals where $t_k = d/v_k$. From the expression (61) it is seen that, by defining $\epsilon_k(t)$ where $k = 1, 2, \ldots, 6$ by $$\epsilon_k(t) \neq f_S^k(t + \tau_k) + f_R^k(t) \tag{38}$$

$$- \{f_S^k(t + \tau_k) - f_R^k(t)\}/Z_k$$

$$[\epsilon_1\ \epsilon_2\ \epsilon_3\ \epsilon_4\ \epsilon_5\ \epsilon_6]^t = [\phi]$$

is always fulfilled unless an internal fault occurs on the transmission line where $[\phi]$ is a zero vector as above described. However, in the presence of an internal fault occurring on the transmission line $$[\epsilon_1 \epsilon_2 \epsilon_3 \epsilon_4 \epsilon_5 \epsilon_6]t = [\phi]$$

results. Thus the expression (38) can be used to determine whether or not an internal fault occurs.

Since the righthand side of the expression (38) includes electrical quantities concerning the mode region, such quantities can be calculated from corresponding quantities concerning the phase region as in the expression (30). More specifically, the inverse transformations expressed by $$\begin{bmatrix} f^1 \\ f^2 \\ f^3 \\ f^4 \\ f^5 \\ f^6 \end{bmatrix} = [S]^{-1} \begin{bmatrix} e^{a1} \\ e^{b1} \\ e^{c1} \\ e^{a2} \\ e^{b2} \\ e^{c2} \end{bmatrix} \quad (39)$$

and $$\begin{bmatrix} j^1 \\ j^2 \\ j^3 \\ j^4 \\ j^5 \\ j^6 \end{bmatrix} = [Q]^{-1} \begin{bmatrix} i^{a1} \\ i^{b1} \\ i^{c1} \\ i^{a2} \\ i^{b2} \\ i^{c2} \end{bmatrix} \quad (40)$$

which are the inversion of the transformations (32) and (33) are effected and the quantities in the mode region are calculated from those concerning the phase region.

In the expressions (39) and (40) $[S]^{-1}$ and $[Q]^{-1}$ are also constants inherent to the particular transmission line and $\epsilon_k(t)$ in each mode can be found by substituting the expressions (39) and (40) into the expression (38).

Regarding the traveling wave traveling from the R to the S terminal, $$f_S{}^k(t) + Z_k j_S{}^k(t) = f_R{}^k(t + \tau_k) - Z_k j_R{}^k(t + \tau_k)$$

is obtained in the same manner as the expression (35). By defining $\epsilon_k(t)$ by $$\epsilon_k(t) = f_S^k(t) + f_R^k(t + \tau_k) \quad (41)$$
$$- \{f_R^k(t + \tau_k) - f_S^k(t)\}/Z_k$$

as in the expression (38), whether or not an internal fault occurs can be determined by utilizing those $\epsilon_1(t)$, $\epsilon_2(t)$, ..., $\epsilon_6(t)$.

While the principles of the present invention have been described, by way of example, in conjunction with a double circuit two-terminal three-phase transmission line, it is to be understood that the present invention is equally applicable to n-circuit two-terminal three-phase transmission lines where n is an integer having a value greater than two. In the latter case, k may be equal to 1, 2, ..., n in the expressions (38) and (41) in order to determine whether or not an internal fault occurs on n circuit transmission lines involved.

Figure 9:
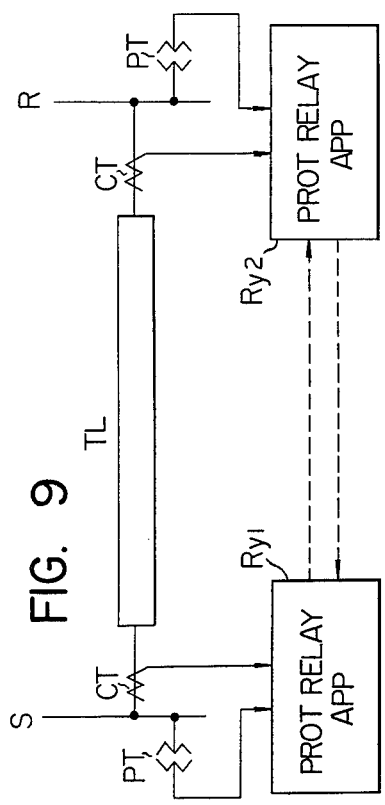
FIG. 9 is a schematic chart illustrating a flow of information through one form of the present invention applied to the two-terminal section shown in FIG. 7.
Figure 8:
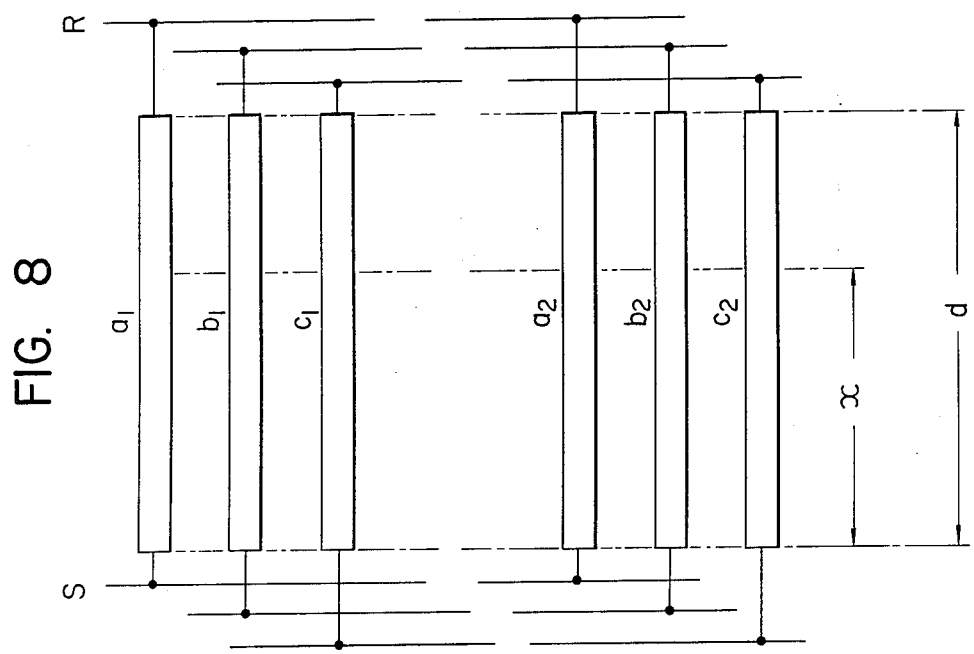
FIG. 8 is a diagram similar to FIG. 7 but illustrating a double circuit two-terminal three-phase transmission line.

FIG. 9 illustrates still another modification of the present invention applied to a single-circuit two-terminal three-phase transmission line such as shown in FIG. 8. The arrangement is schematically shown by a single-phase model only for purposes of illustration and comprises a single-circuit two-terminal three-phase transmission line TL, a pair of terminals S and R of the line TL, a current transformer CT connected to the line at each terminal and a potential transformer PT connected to a bus connected to each terminal. It is noted that the current transformer CT is representative of three current transformers disposed at each terminal and connected to the phases a, b and c of the transmission line and the potential transformers PT is similarly representative of three-potential transformers connected to the phases a, b and c of the bus.

Then, on either of the terminal sides, the current and potential transformers CT and PT are connected to a digital protective relaying apparatus Ry1 or Ry2 constructed in accordance of the principles of the present invention. Those apparatus are identical to each other and one of them is shown in block form in FIG. 10 with priority given to a flow of information. Also in FIG. 10 it is noted that the block form is shown only in conjunction with a single mode representative of the three modes as above described.

Figure 10:
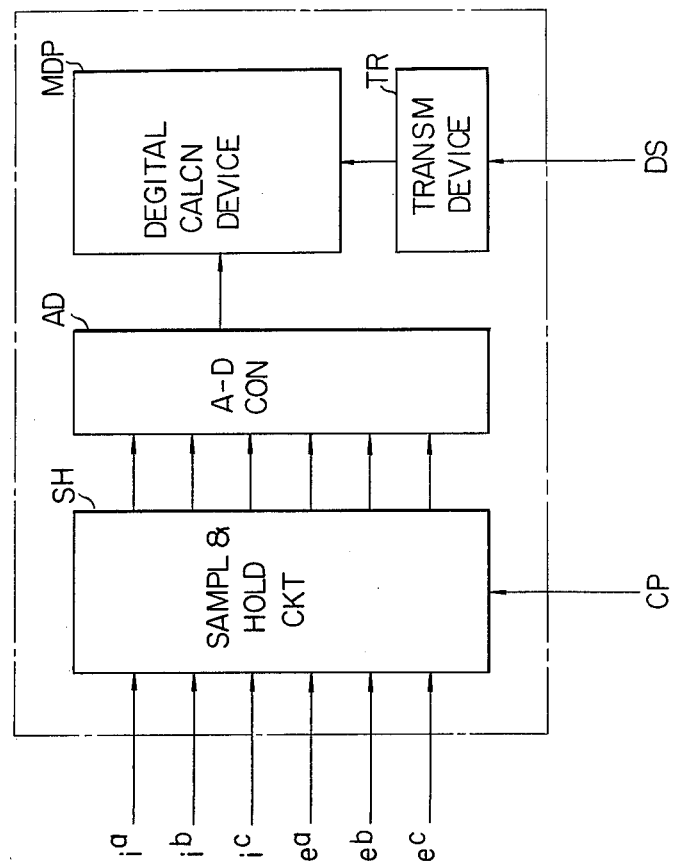
FIG. 10 is a block diagram of one embodiment according to the digital protective relaying system of the present invention for protecting the transmission line shown in FIG. 7.

As shown in FIG. 10, a three-phase current $i^a$, $i^b$, $i^c$ and a three-phase voltage $e^a$, $e^b$, $e^c$ measured by the current and potential transformer CT and PT (not shown in FIG. 10) disposed at the associated terminal, in this case the S terminal, are supplied to a sampling and holding circuit SH subsequently connected to an analog-to-digital conversion circuit AD. The A-D conversion circuit AD is then connected to a digital calculation device MDP including a memory (not shown).

A clock pulses CP are supplied to the sampling and holding circuit SH to determine time points where the three-phase current and voltage are sampled while digital data DS formed by the digital protective relaying apparatus disposed at the other terminal are applied to the calculation device MDP through a data transmission device TR.

In operation, a sampling clock pulse CP is supplied to the S terminal at time point $t + \tau_k$ to cause the sampling and holding circuit SH disposed at the S terminal to sample and hold the currents and voltages on the phases a, b, and c in synchronization with the sampling clock pulse CP. The circuit SH delivers the sampled currents and voltages to the analog-to-digital conversion circuit AD where they are converted to respective digital currents and voltages. The converter circuit AD supplies the digital currents $$i_S{}^a(t+\tau_k), i_S{}^b(t+\tau_k) \text{ and } i_S{}^c(t+\tau_k)$$

and the digital voltages $$e_S{}^a(t+\tau_k), e_S{}^b(t+\tau_k) \text{ and } e_S{}^c(t+\tau_k)$$

on the phases a, b and c to the digital calculation device MDP.

On the other hand, digital data concerning currents and voltages measured by the current and potential transformers at the R terminal and at time point t, that is to say, currents $i_R{}^a(t)$, $i_R{}^b(t)$ and $i_R{}^c(t)$ and voltages $e_R{}^a(t)$, $e_R{}^b(t)$ and $e_R{}^c(t)$ on the phases a, b and c are supplied to the calculation device MDP through the data transmission device TR.

The digital calculation device MDP uses the digital data thus collecting thereto to calculate the expression (43) or (50). Then $\epsilon_1(t)$, $\epsilon_2(t)$ and $\epsilon_3(t)$ calculated as above described are used to determine if an internal fault occurs.

For example, if the logic operations $$|\epsilon_1(t)| > \delta_1, |\epsilon_2(t)| > \delta_2, |\epsilon_3(t)| > \delta_3$$

are fulfilled where $\delta_1$, $\delta_2$ and $\delta_3$ are set values, then the occurrence of an internal fault is determined. Alternatively, a linear transformation may be conducted with a three-dimensional vector expressed by $[\epsilon_1(t) \; \epsilon_2(t) \; \epsilon_3(t)]^t$ to form another three-dimensional vector. Then the logic operations as above described are performed with each of components forming the latter vector. In the latter case, $[S]$ and $[Q]$ in the expressions (22) and (23) may be used as the linearly transformed matrices.

If the occurrence of an internal fault is determined as a result of the calculation as above described then the digital calculation device MDP delivers a trip signal to an associated circuit breaker (not shown) an in the embodiments of the present invention as previously described.

While the operation of the arrangement shown in FIGS. 9 and 10 has been described in conjunction with the S terminal it is to be understood that the arrangement is similarly operated with respect to the R terminal.

Also while the present invention has been described in conjunction with a single circuit transmission line it is to be understood that the same is equally applicable to transmission lines including two or more circuits.

Figure 11:
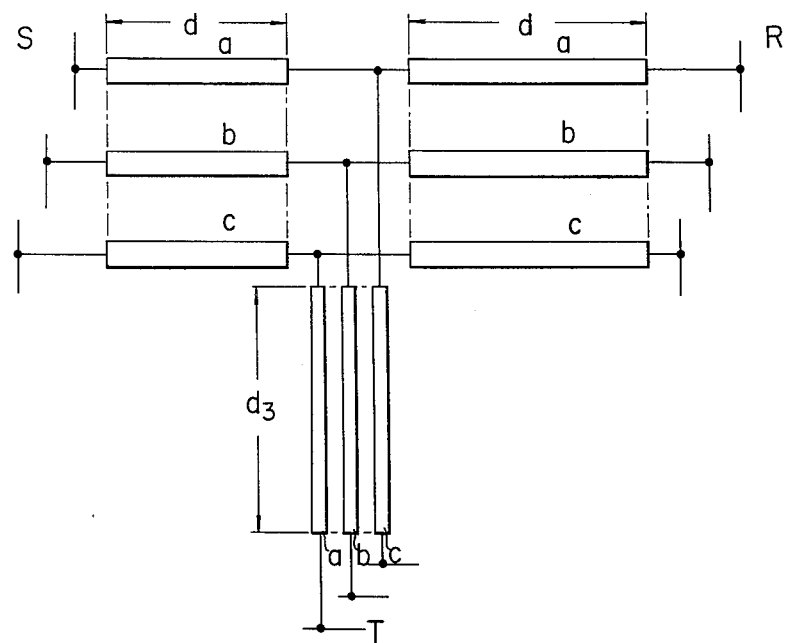
FIG. 11 is a connection diagram of a single-circuit three-terminal three-phase transmission line represented by a distributed constant model.

For a better understanding of the principles of the present invention applied to multiple-terminal three-phase transmission lines, the propagation of the traveling wave along multiple-terminal three-phase transmission lines will now be described in conjunction with FIG. 11 wherein there is schematically illustrated a single-circuit three-terminal three-phase transmission line. In FIG. 11, the transmission line includes three line sections SX, RX and TX connected together to a branch point X and terminating at S, R and T terminals respectively. The three line sections SX, RX and TX have respective distances $d_1$, $d_2$ and $d_3$, each including three-conductors or phases a, b and c. The transmission line is illustrated by a three-phase distributed constant circuit having inductance matrices $[Z_1]$, $[Z_2]$ and $[Z_3]$ and capacitance matrices $[Y_1]$, $[Y_2]$ and $[Y_3]$ per unit length of the respective line sections.

In order to derive the principles of the present invention applied to the arrangement of FIG. 11, the line section SX will now be described with reference to FIG. 12 wherein there is illustrated the section SX of the transmission line along with associated currents and voltages. On the lefthand portion (a) of FIG. 12, the phases a, b, and c at the S terminal have phase voltages $e_S{}^a$, $e_S{}^b$ and $e_S{}^c$ and phase currents $i_S{}^a$, $i_S{}^b$ and $i_S{}^c$ while those at the X terminal or branch point have phase voltages $e_X{}^a$, $e_X{}^b$ and $e_X{}^c$ and phase current $i_{XS}{}^a$, $i_{XS}{}^b$ and $i_{XS}{}^c$. The phase currents are positive when they enter the line section. Further the arrow denoted between each pair of phases describes that the interaction exists between those phases.

Figure 12:
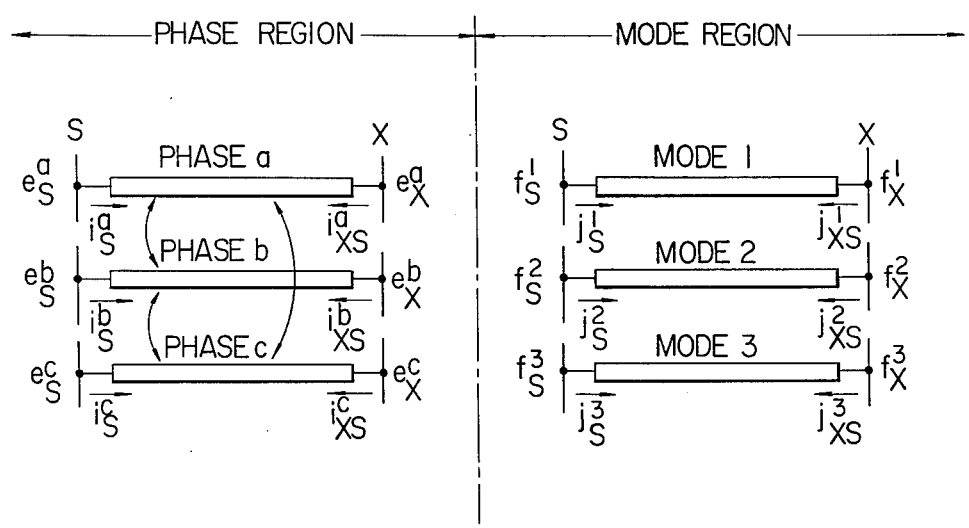
FIG. 12 is an explanatory diagram illustrating a two-terminal section of the transmission line shown in FIG. 11 and a corresponding section of a transmission line provided through the mode transformation of the former line.

In FIG. 12, a three-phase voltage [e] and a three-phase current [i] at a point x spaced away from the S terminal by a distance x at time point t satisfy expressions identical to the expressions (26) and (27) that is, $$-\frac{\partial [e]}{\partial x} = [Z] \frac{\partial [i]}{\partial t}$$

and $$-\frac{\partial [i]}{\partial x} = [Y] \frac{\partial [e]}{\partial t}$$

In this case [e] and [i] are column vectors while [Z] and [Y] are symmetric matrices each including three rows and three columns. Also the matrix [Z] includes components as determined by self-inductances on the respective phase and mutual inductances between the phases while the matrix [Y] includes components as determined by self-capacitances on the respective phases and mutual capacitances between the phases.

The [e] and [i] are subjected to linear transformations [S] and [Q] similar to those represented by the expressions (22) and (23) to be transformed from the phase region to the mode region.

By properly selecting the transformation matrices [S] and [Q], the three-phase transmission line can be resolved into three single-phase transmission lines formed of independent modes respectively. In this case, the three-phase line section SX in the phase region shown on the lefthand portion (a) of FIG. 12 is transformed to three single-phase line sections in the mode region shown on the righthand portion (b) thereof.

As shown on the righthand portion (b) of FIG. 12, the modes 1, 2 and 3 at the S terminal have mode voltages $f_S{}^1$, $f_S{}^2$ and $f_S{}^3$ and mode current $j_S{}^1$, $j_S{}^2$ and $j_S{}^3$ while those at the X terminal have mode voltages $f_X{}^1$, $f_X{}^2$ and $f_X{}^3$ and mode current $j_{XS}{}^1$, $j_{XS}{}^2$ and $j_{XS}{}^3$. The currents are positive when they enter the associated mode line sections.

It is well known that, a mode current $j^k$ through and a mode voltage $f^k$ on the transmission line section in the mode k satisfy partial differential equations $$-\frac{\partial f^k}{\partial x} = l_k^1 \frac{\partial j^k}{\partial t} \tag{42}$$

and $$-\frac{\partial j^k}{\partial x} = c_k^1 \frac{\partial f^k}{\partial t} \tag{43}$$

where k=1, 2, 3 and $l_k{}^l$ and $c_k{}^l$ designate an inductance and a capacitance per unit length of the mode k respectively. Also it is well known that the $f^k$ and $j^k$ are given respectively by $$f^k = F_k(t - \frac{x}{u_k^1}) + G_k(t + \frac{x}{u_k^1}) \tag{44}$$

and $$j^k = \frac{1}{Z_k^1} \{F_k(t - \frac{x}{u_k^1}) - G_k(t + \frac{x}{u_k^1})\} \tag{45}$$

where $$Z_k^1 = \sqrt{l_k^1 / c_k^1}, \quad u_k^1 = 1 / \sqrt{l_k^1 c_k^1}$$

and $F_k(t - \frac{x}{u_k^1})$ and $G_k(t + \frac{x}{u_k^1})$ designate traveling waves directed from the S to the X terminal and from the X to the S terminal respectively.

Like the expressions (39) and (40), eliminating $$G_k(t + \frac{x}{u_k^1})$$

from both expressions (44) and (45) yields $$f^k + Z_k^1 j^k = 2F_k(t - \frac{x}{u_k^1}) \tag{46}$$

Therefore the mode currents and voltages at the S and X terminals satisfy $$f_S^k(t - \tau_k^1) + Z_k j_S^k(t - \tau_k^1) \tag{47}$$

$$= f_X^k(t) - Z_k j_{XS}^k(t)$$

where $\tau_k{}^l$ designates a surge propagation time defined by $\tau_k{}^l = d_l/u_k{}^l$. As above described, the mode currents $j_S{}^k$ and $j_{XS}{}^k$ flowing into the transmission line section in the mode k have the positive direction as shown on the righthand portion (b) of FIG. 12.

On the other hand, the expressions (44) and (45) yields also $$f_x^k - z_k^1 j^k = 2G_k(t - \frac{x}{u_k^1}) \quad (48)$$

Therefore, $$f_S^k(t + \tau_k^1) - z_k^1 j_S^k(t + \tau_k^1) \quad (49)$$
$$= f_x^k(t) + z_k^1 j_{xS}^k(t)$$

is held as does the expression (47). Eliminating $f_x^k(t)$ from the expressions (47) and (49) results in $$f_S^k(t + \tau_k^1) + f_S^k(t - \tau_k^1) - \frac{1}{z_k^1} \{j_S^k(t + \tau_k^1) \quad (50)$$
$$- j_S^k(t - \tau_k^1)\} = -2f_{xS}^k(t)$$

By using matrices and vectors, the expression (50) with respect to the three modes may be rewritten as $$[\sqcup_1][j_S(t + \tau_1^1)] + [\sqcup_2][j_S(t + \tau_2^1)] \quad (51)$$
$$+ [\sqcup_3][j_S(t + \tau_3^1)] + [\sqcup_1][j_S(t - \tau_1^1)]$$
$$+ [\sqcup_2][j_S(t - \tau_2^1)] + [\sqcup_3][j_S(t - \tau_3^1)]$$
$$- \frac{1}{z_1^1} [\sqcup_1]\{[f_S(t + \tau_1^1)] - [f_S(t - \tau_1^1)]\}$$
$$- \frac{1}{z_2^1} [\sqcup_2]\{[f_S(t + \tau_2^1)] - [f_S(t - \tau_2^1)]\}$$
$$- \frac{1}{z_3^1} [\sqcup_3]\{[f_S(t + \tau_3^1)] - [f_S(t - \tau_3^1)]\}$$
$$= -2[j_{xS}(t)]$$

where $[\sqcup_1]$, $[\sqcup_2]$ and $[\sqcup_3]$ designate respective unit vectors expressed by $$[\sqcup_1] = \begin{bmatrix} 1 & 0 & 0 \\ 0 & 0 & 0 \\ 0 & 0 & 0 \end{bmatrix} \quad [\sqcup_2] = \begin{bmatrix} 0 & 0 & 0 \\ 0 & 1 & 0 \\ 0 & 0 & 0 \end{bmatrix}$$

$$[\sqcup_3] = \begin{bmatrix} 0 & 0 & 0 \\ 0 & 0 & 0 \\ 0 & 0 & 1 \end{bmatrix}$$

and $[j_S]$ and $[f_S]$ designate a mode current vector and a mode voltage vector respectively.

Multiplying the lefthand side of the expression (51) by a current transformation matrix $[Q_1]$ for the section SX gives the relationship in the phase region as expressed by $$[Q_1][\sqcup_1][Q_1]^{-1}[i_S(t + \tau_1^1)] + [Q_1][\sqcup_2][Q_1]^{-1}[i_S(t + \tau_2^1)] \quad (52)$$
$$+ [Q_1][\sqcup_3][Q_1]^{-1}[i_S(t + \tau_3^1)] + [Q_1][\sqcup_1][Q_1]^{-1}[i_S(t - \tau_1^1)]$$
$$+ [Q_1][\sqcup_2][Q_1]^{-1}[i_S(t - \tau_2^1)] + [Q_1][\sqcup_3][Q_1]^{-1}[i_S(t - \tau_3^1)]$$
$$- \frac{1}{z_1^1} [Q_1][\sqcup_1][S_1]^{-1}\{[e_S(t + \tau_1^1)] - [e_S(t - \tau_1^1)]\}$$
$$- \frac{1}{z_2^1} [Q_1][\sqcup_2][S_1]^{-1}\{[e_S(t + \tau_2^1)] - [e_S(t - \tau_2^1)]\}$$
$$- \frac{1}{z_3^1} [Q_1][\sqcup_3][S_1]^{-1}\{[e_S(t + \tau_3^1)] - [e_S(t - \tau_3^1)]\}$$
$$= -2[\hat{i}_{xS}(t)]$$

where $[\hat{i}_{xS}(t)]$ designates an estimated value of a three-phase current flowing from the X to the S terminal at time point t. By substituting measured values of a three-phase voltage at the S terminal and at time point $t(t \pm \tau_1^1)$, $(t \pm \tau_2^1)$ and $(t \pm \tau_3^1)$ into the expression (52), the $[\hat{i}_{xS}(t)]$ can be calculated. Similar expressions in the sections RX and TX can be obtained in the same manner as the expression (52). That is, $$\sum_{j=1}^{3} [Q_2][\sqcup_j][Q_2]^{-1}[i_R(t + \tau_j^2)] \quad (52)$$
$$+ \sum_{j=1}^{3} [Q_2][\sqcup_j][Q_2]^{-1}[i_R(t - \tau_j^2)]$$
$$- \sum_{j=1}^{3} \frac{1}{z_j^2} [Q_2][\sqcup_j][S_2]^{-1}\{[e_R(t + \tau_j^2)]$$
$$- [e_R(t - \tau_j^2)]\} = -2[\hat{i}_{xR}(t)]$$

and $$\sum_{j=1}^{3} [Q_3][\sqcup_j][Q_3]^{-1}[i_T(t + \tau_j^3)] \quad (53)$$
$$+ \sum_{j=1}^{3} [Q_3][\sqcup_j][Q_3]^{-1}[i_T(t - \tau_j^3)]$$
$$- \sum_{j=1}^{3} \frac{1}{z_j^3} [Q_3][\sqcup_j][S_3]^{-1}\{[e_T(t + \tau_j^3)]$$
$$- [e_T(t - \tau_j^3)]\} = -2[\hat{i}_{xT}(t)]$$

are held in the sections RX and TX respectively where $[\hat{i}_{xR}(t)]$ and $[\hat{i}_{TX}(t)]$ designate an estimated value of a three-phase current flowing from the X to the R terminal and that flowing from the X to the T terminal respectively.

From the foregoing it is seen that the estimated values of all phase currents at the terminal X can be obtained from the expressions (52), (53) and (54).

Figure 13:
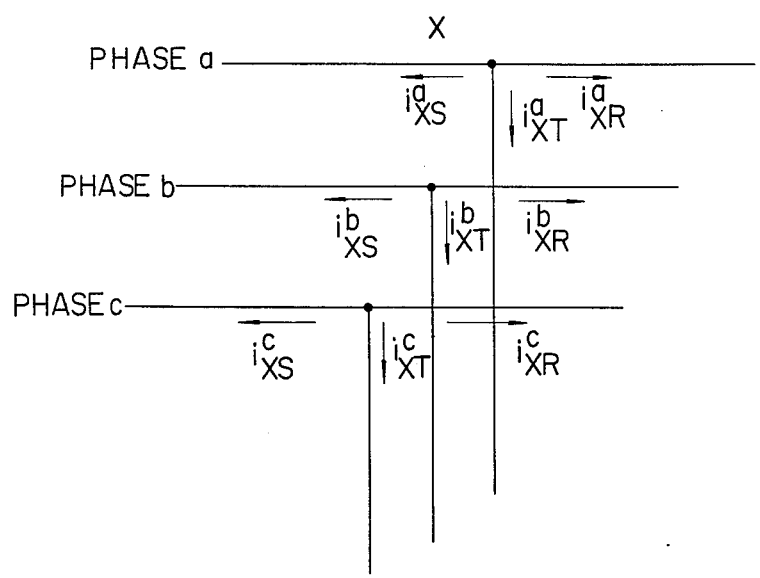
FIG. 13 is a diagram illustrating a three-phase current flowing through a branch point where three-terminal three-phase transmission line sections are interconnected.

FIG. 13 shows all phase currents flowing into conductors on the phases a, b and c from the associated branch points X. For example, a phase current $i_{XS}{}^a$ flows from the branch point X on the phase a into a conductor on the same phase, and a phase current $i_{XR}{}^b$ flows from the branch point X on the phase b into a conductor on the same phase. Also $i_{XS}{}^c$, $i_{XR}{}^c$ and $i_{XT}{}^c$ designate phase currents on the phase c.

From FIG. 13 it is seen that all the actual phase currents passed through the branch point X on each phase sum to a zero value according to the Kirchoff's first law. This is expressed by $$[i_{XS}(t)] + [i_{XR}(t)] + [i_{XT}(t)] = [\phi]$$

where $[\phi]$ designates a zero vector as above described.

By defining $\epsilon^a(t)$, $\epsilon^b(t)$ and $\epsilon^c(t)$ by $$\begin{bmatrix} \epsilon^a(t) \\ \epsilon^b(t) \\ \epsilon^c(t) \end{bmatrix} = [\hat{i}_{XS}(t)] + [\hat{i}_{XR}(t)] + [\hat{i}_{XT}(t)] \quad (55)$$

it is seen that, when no fault occurs within the three-terminal line, $$\begin{bmatrix} \epsilon^a(t) \\ \epsilon^b(t) \\ \epsilon^c(t) \end{bmatrix} = [\phi]$$

is satisfied because the estimated values of the currents on the righthand side of the expression (55) are null. On the other hand, if a fault occurs within the three-terminal line then the estimated values of the currents as above mentioned is not null. In the latter case $$\begin{pmatrix} \epsilon^a(t) \\ \epsilon^b(t) \\ \epsilon^c(t) \end{pmatrix} \neq [\phi]$$

results. This indicates the occurrence of an internal fault.

The physical meaning of the expressions (42) through (49) will now be described. In the expression (44) and (45) the $F_k$ designates a traveling wave traveling from the S terminal toward the branch point X and the $G_k$ designates a traveling wave traveling from the branch point X to the S terminal as above described. The expression (47) describes that the traveling wave $F_k$ directed from the S terminal to the branch point X reaches the branch point X upon of a time interval $\tau_k^l$ elapsing and the expression (49) describes that the traveling wave $G_k$ directed from the branch point X to the S terminal reaches the S terminal upon the time interval $\tau_k^l$ elapsing. It is to be noted that the expressions (47), (49) and (50) are always satisfied unless a fault exists between the S terminal and the branch point X.

Figure 14:
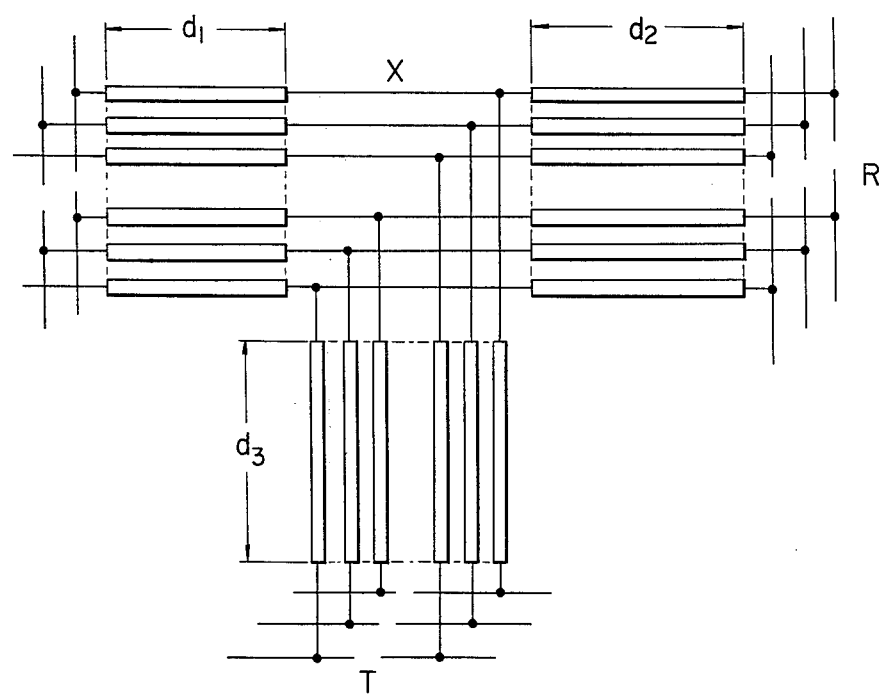
FIG. 14 is a diagram similar to FIG. 11 but illustrating a double circuit three-terminal three-phase transmission line represented by a distributed constant model.

The principles of the present invention will now be described in conjunction with a double-circuit three-terminal three-phase transmission line that is typical of multiple-circuit multiple-terminal three-phase transmission lines. FIG. 14 shows such a double-circuit three-terminal three-phase transmission line that is different from the single-circuit three-terminal three-phase transmission line illustrated in FIG. 11 only in that in FIG. 14 each line section is composed of two circuits each including three conductors. As in the arrangement of FIG. 11, a three-phase distributed constant circuit shown in FIG. 14 has inductance matrices $[Z_1]$, $[Z_2]$ and $[Z_3]$ and capacitance matrices $[Y_1]$, $[Y_2]$ and $[Y_3]$.

Figure 15:
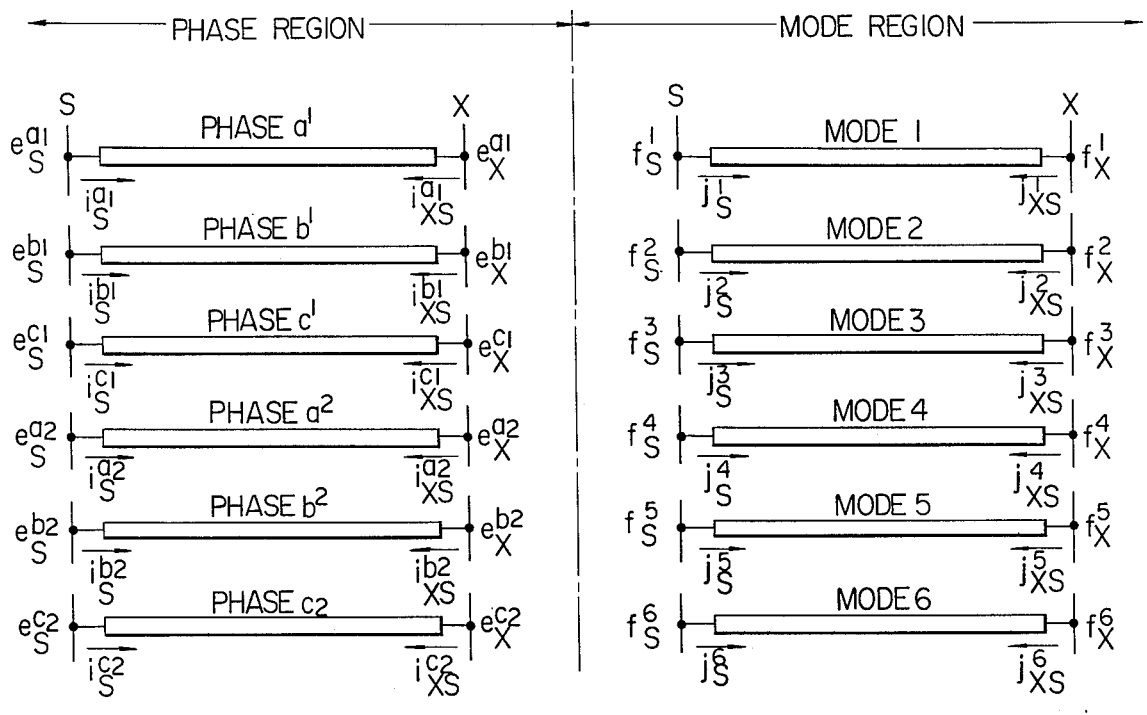
FIG. 15 is a diagram similar to FIG. 12 but illustrating the transmission line shown in FIG. 14.

FIG. 15 shows the line section SX of the transmission lines and phase voltages and currents developed at both terminals thereof. As shown on the lefthand portion (a) of FIG. 15, the S terminal has phase voltages $e_s^{a1}$, $e_s^{b1}$, $e_s^{c1}$, $e_s^{a2}$, $e_s^{b2}$ and $e_s^{c2}$ developed thereat and phase currents $i_s^{a1}$, $i_s^{b1}$, $i_s^{c1}$, $i_s^{a2}$, $i_s^{b2}$ and $i_s^{c2}$ flowing therethrough while the branch point or T terminal has phase voltages $e_x^{a1}$, $e_x^{b1}$, $e_x^{c1}$, $e_x^{a2}$, $e_x^{b2}$ and $e_x^{c2}$ developed thereat and phase currents $i_{xs}^{a1}$, $i_{xs}^{b1}$, $i_{xs}^{c1}$, $i_{xs}^{a2}$, $i_{xs}^{b2}$ and $i_{xs}^{c2}$ flowing therethrough. As in the arrangement of FIG. 12, the phase currents are positive when they enter the conductors on the respective phases.

As above described in conjunction with FIG. 11, transformation matrices [S] and [Q] can be properly selected to resolve the three-phase transmission line into six lines composed of independent modes respectively. In this case, the three-phase line section SX shown on the lefthand portion (a) of FIG. 15 is transformed to a line section in the mode region as illustrated on the righthand portion (b) thereof which is similar to the righthand portion (b) of FIG. 12 except for the number of the modes.

Assuming that a conductor in the mode k where $k=1, 2, \ldots, 6$ has an inductance $l_k^l$ and a capacitance $c_k^l$ per unit length, mode voltages $f_s^k$ and $f_x^k$ and mode currents $j_s^k$ and $j_{xs}^k$ satisfy $$-\frac{\delta j^k}{\delta x} = l_k^l \frac{\delta f^k}{\delta t}$$

and $\quad k = 1, 2, \ldots, 6$ $$-\frac{\delta f^k}{\delta x} = c_k^l \frac{\delta j^k}{\delta t}$$

Deduced from the above partial differential equations are $$f_s^k(t-\tau_k^l)+Z_k j_s^k(t-\tau_k^l)=f_x^k(t)-Z_k j_{xs}^k(t)$$

and $$f_s^k(t+\tau_k^l)-Z_k j_s^k(t+\tau_k^l)=f_x^k(t)+Z_k j_{xs}^k(t)$$

in the manner similar to that described in conjunction with the expressions (47) and (49). Then eliminating $f_x^k(t)$ from the two expressions thus deduced obtains $$j_s^k(t + \tau_k^l) + j_s^k(t - \tau_k^l) - \frac{1}{Z_k^l} \{f_s^k(t + \tau_k^l) - f_s^k(t - \tau_k^l)\} = -2j_{xs}^k(t)$$

which is similar to the expression (50). By using matrices and vectors, this expression with respect to the six modes may be rewritten as $$\begin{aligned}
& [\sqcup_1][j_s(t + \tau_1^l)] + [\sqcup_2][j_s(t + \tau_2^l)] + \\
& \quad [\sqcup_3][j_s(t + \tau_3^l)] + [\sqcup_4][j_s(t + \tau_4^l)] + \\
& \quad [\sqcup_5][j_s(t + \tau_5^l)] + [\sqcup_6][j_s(t + \tau_6^l)] + \\
& [\sqcup_1][j_s(t - \tau_1^l)] + [\sqcup_2][j_s(t - \tau_2^l)] + \\
& \quad [\sqcup_3][j_s(t + \tau_3^l)] + [\sqcup_4][j_s(t - \tau_4^l)] + \\
& \quad [\sqcup_5][j_s(t - \tau_5^l)] + [\sqcup_6][j_s(t - \tau_6^l)] - \\
& \frac{1}{Z_1^l}[\sqcup_1]\{[f_s(t + \tau_1^l)] - [f_s(t - \tau_1^l)]\} - \\
& \frac{1}{Z_2^l}[\sqcup_2]\{[f_s(t + \tau_2^l)] - [f_s(t - \tau_2^l)]\} - \\
& \frac{1}{Z_3^l}[\sqcup_3]\{[f_s(t + \tau_3^l)] - [f_s(t - \tau_3^l)]\} - \\
& \frac{1}{Z_4^l}[\sqcup_4]\{[f_s(t + \tau_4^l)] - [f_s(t - \tau_4^l)]\} - \\
& \frac{1}{Z_5^l}[\sqcup_5]\{[f_s(t + \tau_5^l)] - [f_s(t - \tau_5^l)]\} - \\
& \frac{1}{Z_6^l}[\sqcup_6]\{[f_s(t + \tau_6^l)] - [f_s(t - \tau_6^l)]\} = \\
& \qquad\qquad\qquad\qquad\qquad -2[j_{xs}(t)]
\end{aligned} \quad (56)$$

where $[\sqcup_k]$ designates a unit vector with six rows and six columns expressed by $$[\sqcup_k] = k \cdot \begin{bmatrix} 0 & & k & & \phi \\ & \ddots & \vdots & & \\ & & 0 & & \\ \cdots & \cdots & 1 & \cdots & \cdots \\ & & & 0 & \\ & & \vdots & & \ddots \\ \phi & & & & 0 \end{bmatrix}$$

$[j_s]$ designates a mode current vector and $[f_s]$ designates a mode voltage vector. By inversely transforming the expression (56) from the mode to the phase region, an estimated value $[i_{xs}(t)]$ of the phase current can be found as expressed by $$\sum_{j=1}^{6} [Q_1][\sqcup_j][Q_1]^{-1}[i_s(t + \tau_j^l)] + \qquad (57)$$

$$\sum_{j=1}^{6} [Q_1][\sqcup_j][Q_1]^{-1}[i_s(t - \tau_j^l)] -$$

$$\sum_{j=1}^{6} \frac{1}{Z_j^1} [Q_1][\cup_j][S_1]^{-1}\{[e_S(t + \tau_j^1)] -$$

$$[e_S(t - \tau_j^1)]\} = -2[\hat{i}_{XS}(t)] \quad$$

where $[S_1]$ and $[Q_1]$ designate transformation matrices for voltage and current respectively concerning the line section SX.

Thus it is seen that an estimate value $[\hat{i}_{XS}(t)]$ of a three-phase current directed from the X to the S terminal at time point t can be calculated from measured values of the three-phase currents and voltage at the S terminal at time points $(t \pm \tau_1^1)$, $(t \pm \tau_2^1)$, $(t \pm \tau_3^1)$, $(t \pm \tau_4^1)$, $(t \pm \tau_5^1)$ and $(t \pm \tau_6^1)$.

In the line sections RX and TX, estimated values $[\hat{i}_{XR}(t)]$ and $[\hat{i}_{XT}(t)]$ of three-phase currents directed from the X terminal to the R and T terminals respectively are similarly obtained as follows:

$$\sum_{j=1}^{6} [Q_1][\cup_j][Q_2]^{-1}[i_R(t + \tau_j^2)] + \quad (58)$$

$$\sum_{j=1}^{6} [Q_2][\cup_j][Q_2]^{-1}[i_R(t - \tau_j^2)] -$$

$$\sum_{j=1}^{6} \frac{1}{Z_j^2} [Q_2][\cup_j][S_2]^{-1}\{[e_R(t + \tau_j^2)] -$$

$$[e_R(t - \tau_j^2)]\} = -2[\hat{i}_{XR}(t)]$$

for the line section RX and $$\sum_{j=1}^{6} [Q_3][\cup_j][Q_3]^{-1}[i_T(t + \tau_j^3)] + \quad (59)$$

$$\sum_{j=1}^{6} [Q_3][\cup_j][Q_3]^{-1}[i_T(t - \tau_j^3)] -$$

$$\sum_{j=1}^{6} \frac{1}{Z_j^2} [Q_3][\cup_j][S_3]^{-1}\{[e_T(t + \tau_j^3)] -$$

$$[e_T(t - \tau_j^3)]\} = -2[\hat{i}_{XT}(t)]$$

for the line section TX.

Figure 16:
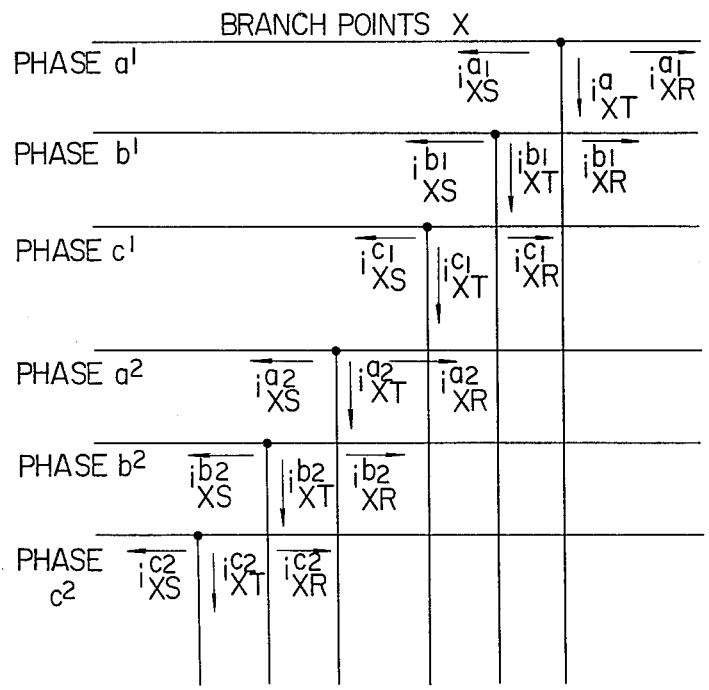
FIG. 16 is a diagram similar to FIG. 13 but illustrating the transmission line shown in FIG. 14.

In this way the estimated values of all the phase currents at the X terminals are obtained from the expressions (57), (58) and (59). Those phase currents are shown in FIG. 16 wherein like reference characters designate phase currents identical or corresponding to those shown in FIG. 13. As above described, the sum of phase currents flowing through the X terminal for each circuit and for each phase becomes null following the Kirchhoff's first law. That is, $$[\hat{i}_{XS}(t)] + [\hat{i}_{XR}(t)] + [\hat{i}_{XT}(t)] = [\phi]$$

is obtained.

Therefore by defining $\epsilon^{a1}(t)$, $\epsilon^{b1}(t)$, $\epsilon^{c1}(t)$, $\epsilon^{a2}(t)$, $\epsilon^{b2}(t)$ and $\epsilon^{c2}(t)$ by $$\begin{pmatrix} \epsilon^{a1}(t) \\ \epsilon^{b1}(t) \\ \epsilon^{c1}(t) \\ \epsilon^{a2}(t) \\ \epsilon^{b2}(t) \\ \epsilon^{c2}(t) \end{pmatrix} = [\hat{i}_{XS}(t)] + [\hat{i}_{XR}(t)] + [\hat{i}_{XT}(t)] \quad (60),$$

one obtains $$\begin{pmatrix} \epsilon^{a1}(t) \\ \epsilon^{b1}(t) \\ \epsilon^{c1}(t) \\ \epsilon^{a2}(t) \\ \epsilon^{b2}(t) \\ \epsilon^{c2}(t) \end{pmatrix} = [\phi]$$

when no fault occurs within the three-phase line section. This is because the sum of the estimated values of the phase currents become null. On the other hand, if an internal fault occurs then the estimated values are not null resulting in $$\begin{pmatrix} \epsilon^{a1}(t) \\ \epsilon^{b1}(t) \\ \epsilon^{c1}(t) \\ \epsilon^{a2}(t) \\ \epsilon^{b2}(t) \\ \epsilon^{c2}(t) \end{pmatrix} \neq [\phi]$$

Thus the expression (60) can be used to determine whether or not an internal fault occurs.

Figure 17:
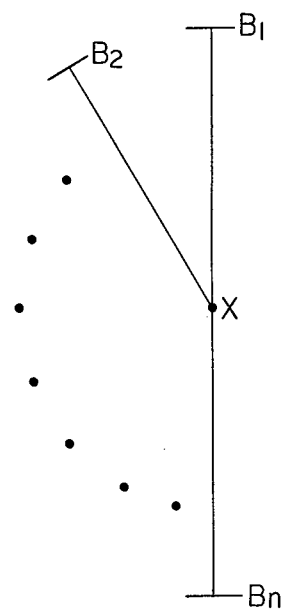
FIG. 17 is a schematic connections diagram of general n terminal sections radially arranged to be connected together at a common branch point.

From the foregoing it will readily be understood that the present invention is equally applicable to radial n-terminal transmission systems such as shown in FIG. 17 as comprising n transmission lines including respective terminals $B_1, B_2, \ldots, B_n$ and connected together at a branch poin X.

Figure 18:
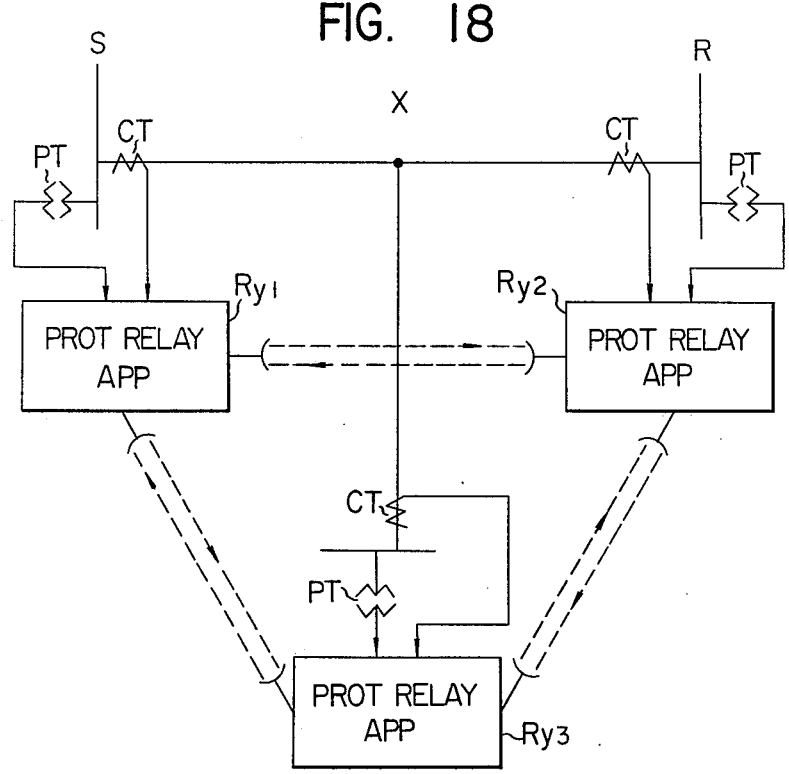
FIG. 18 is a schematic chart illustrating a flow of information through a modification according to the digital protective relaying system of the present invention applied to a three-terminal section such as shown in FIG. 11.

FIG. 18 shows another modification of the present invention applied to a single-circuit three-terminal three-phase transmission line illustrated by a single-phase model. In FIG. 18, a current transformer Ct is connected to each of three phases a, b and c of the transmission line at a different one of three terminals S, T and R thereof. Also, at each of those terminals a potential transformer PT is connected to each of phases a, b and c of an associated bus. Then the current and potential transformers CT and PT respectively at each terminal are connected to the protective relaying apparatus Ry1, Py2 or Py3 of the present invention. The apparatus at the three terminals are identical to one another and one of them is shown in FIG. 19.

Figure 19:
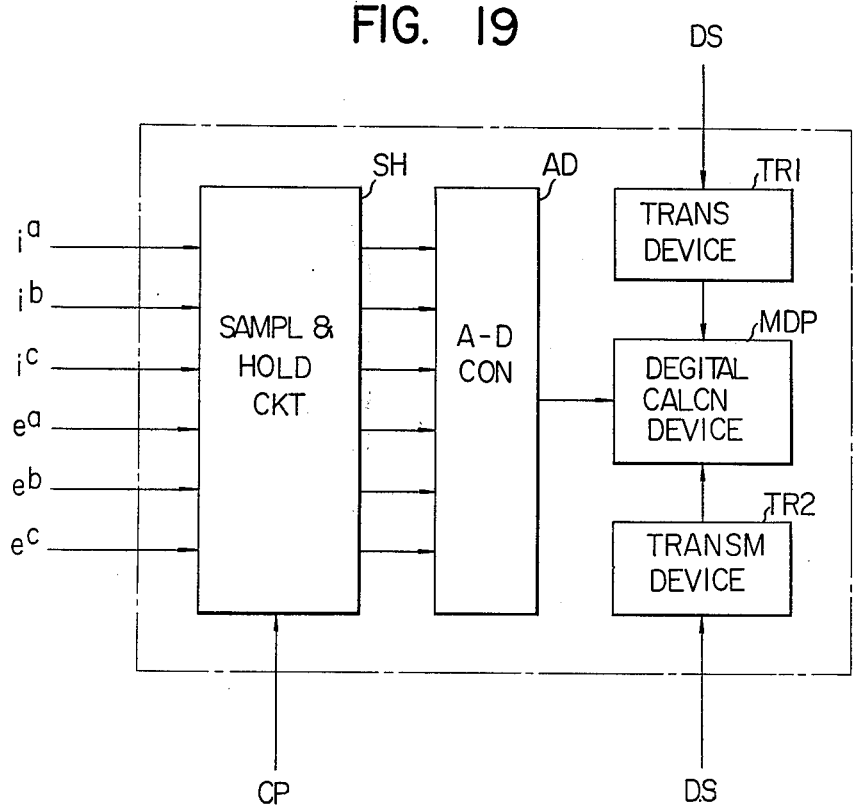
FIG. 19 is a block diagram of another modification according to the digital protective relaying system of the present invention.

The arrangement illustrated in FIG. 19 is different from that shown in FIG. 10 only in that in FIG. 19 the digital calculation device MDP receives data DS at the remaining two terminals through data transmission devices TR1 and TR2 respectively.

The operation of the present invention shown in FIG. 18 and 19 will now be described. At time points $(t-\tau_1^1)$, $(t-\tau_2^1)$, $(t-\tau_3^1)$, $(t+\tau_1^1)$, $(t+\tau_2^1)$ and $(t+\tau_3^1)$ sampling clock pulses CP are supplied to the sampling and holding device SH at the S terminal to cause the latter to sample and hold phase currents and voltages on the phases a, b and c in synchronization with the recept of each of clock pulses. The currents and voltages sampled and held by the device SH are supplied to the analog-to-digital converter AD where they are converted to corresponding digital currents and voltages.

Therefore the converter AD supplies the currents and voltages on the phases a, b and c at the abovementioned sampling time points or $i_s^a(t - \tau_1^1), i_s^b(t - \tau_1^1), i_s^c(t - \tau_1^1), e_s^a(t - \tau_1^1), e_s^b(t - \tau_1^1),$
$e_s^c(t - \tau_1^1)$
$\cdots\cdots\cdots\cdots\cdots\cdots\cdots\cdots\cdots\cdots\cdots\cdots\cdots\cdots$
$i_s^a(t + \tau_3^1), i_s^b(t + \tau_3^1), i_s^c(t + \tau_3^1), e_s^a(t + \tau_3^1), e_s^b(t + \tau_3^1),$ $e_s{}^c(t + \tau_3{}^1)$ in the digital form to the digital calculation device MDP.

On the other hand, digital data concerning currents and voltages at the R terminal at time points $(t - \tau_1{}^2), (t - \tau_2{}^2), (t - \tau_3{}^2), (t + \tau_1{}^2), (t + \tau_2{}^2)$ and $(t + \tau_3{}^2)$ or $i_R{}^a(t - \tau_1{}^2), i_R{}^b(t - \tau_1{}^2), i_R{}^c(t - \tau_1{}^2),$
$e_R{}^a(t - \tau_1{}^2), e_R{}^b(t - \tau_1{}^2), e_R{}^c(t - \tau_1{}^2),$
..........
$i_R{}^a(t + \tau_3{}^2), i_R{}^b(t + \tau_3{}^2), i_R{}^c(t + \tau_3{}^2), e_R{}^a(t + \tau_3{}^2),$
$e_R{}^b(t + \tau_3{}^2), e_R{}^c(t + \tau_3{}^2)$ are introduced into the calculation device MDP through the data transmission device TR1. Also digital data concerning currents and voltages at the T terminal at time points $(t - \tau_1{}^3), (t - \tau_2{}^3), (t - \tau_3{}^3), (t + \tau_1{}^3), (t + \tau_2{}^3)$ and $(t + \tau_3{}^3)$ or $i_T{}^a(t - \tau_1{}^3), i_T{}^b(t - \tau_1{}^3), i_T{}^c(t - \tau_1{}^3),$
$e_T{}^a(t - \tau_1{}^3), e_T{}^b(t - \tau_1{}^3), e_T{}^c(t - \tau_1{}^3),$
..........
$i_T{}^a(t + \tau_3{}^3), i_T{}^b(t + \tau_3{}^3), i_T{}^c(t + \tau_3{}^3), e_T{}^a(t + \tau_3{}^3),$
$e_T{}^b(t + \tau_3{}^3), e_T{}^c(t + \tau_3{}^3)$ are introduced into the calculation device MDP through the data transmission device TR2.

The digital calculation device MDP uses the digital data thus collected thereto to calculate $\epsilon^{a1}(t)$, $\epsilon^{b1}(t)$, $\epsilon^{c1}(t)$, $\epsilon^{a2}(t)$, $\epsilon^{b2}(t)$ and $\epsilon^{c2}(t)$ in the expression (60). The results of the calculations determines whether or not an internal fault occurs in the three-phase section.

For example, if the logic operations $|\epsilon^a(t)| > K_1, |\epsilon^b(t)| > K_2, |\epsilon^c(t)| > K_3$ where $K_1$, $K_2$ and $K_3$ are set values are satisfied, then one determines the occurrence of an internal fault. Alternatively, the logic opertions as above described may be performed with respective components of a three-dimensional vector obtained as a result of a linear transformation to a three dimensional vector expressed by $[\epsilon^a(t), \epsilon^b(t), \epsilon^c(t)]^t$.

If the result of the calculations determines the occurrence of an internal fault, then the calculation device MDP delivers a trip signal to an associated circuit breaker (not shown) for protective purposes.

While the operation of the arrangement shown in FIGS. 18 and 19 has been described in conjunction with the S terminal it is to be understood that it may be similarly operated in conjunction with the R or T terminal. Also it is to be understood that the arrangement as shown in FIGS. 18 and 19 may be equally extended to general multiple circuit transmission lines.

From the foregoing it is seen that the present invention comprises means for detecting a change in propagation mode of a traveling wave traveling along a protected transmission line thereby to protect that transmission line. Thus the present invention is characterized in that the original waveforms of the system voltage and current can be utilized while they are left intact. Then, by paying attention to the propagation of the traveling wave along transmission lines, the present invention discloses an expression which is not satisfied with an internal fault occurring in the particular protected line section but which is always satisfied with any fault occurring externally of the protected line section. Consequently the present invention provides a perfect system for detecting internal system faults. This ensures that protective relaying apparatus can be perfectly prevented from either performing mulfunction or being erroneously inoperative due to the influence of surges attendant upon the opening and closing of associated switches or transients developed upon an internal fault. Thereby the disadvantages of conventional protective relaying systems can be eliminated and also the operation of transmission lines can be determined by employing instantaneous values of associated electric quantities. As a result, the present invention provides a protective relaying system distinctively excellent in high speed performance as compared with the prior art practice.

While the present invention has been illustrated and described in conjunction with several preferred embodiments thereof it is to be understood that numerous changes and modifications may be resorted to without departing from the spirit and scope of the present invention. For example, the arrangement as shown in FIGS. 18 and 19 has been described to calculate the expressions (52) and (60) by using intact currents and voltages sampled at sampling time points as data concerning not only a selected one of the S, R and T terminals where the calculation device MDP calculating those expressions is disposed but also the remaining terminals. The present invention, however, may be modified so that, the lefthand sides of the expressions (53) and (54) or (58) and (59) are calculated with associated data at the remaining terminals and only the results of the calculation from the remaining terminals are transmitted to the selected terminal where the expressions (55) or (60) are calculated to obtain $\epsilon^a(t)$, $\epsilon^b(t)$ and $\epsilon^c(t)$.

What we claim is:

1. A protective relaying system, comprising: a protected AC transmission line having a pair of line ends and defining a propagation path for a traveling wave propagating along said transmission line between said line ends for a surge propagation time $\tau$; and detection means for detecting a change in propagation mode of the traveling wave due to a transmission line fault, wherein said detection means is effective for comparing a value of the traveling wave as it passes one of the line ends at time $t - \tau$ and a value of the traveling wave as it passes the other of the line ends at time t after the surge propagation time has elapsed for detecting a change in wave value resulting from a change in wave propagation mode.

2. A protective relaying system comprising a protective AC transmission line including n AC line sections connected together at a branch point and having respective ends, traveling waves traveling at finite propagation velocities along said transmission line between said ends, said line sections having surge propagation times $\tau_1, \tau_2 - - -, \tau_3$ for the traveling wave, each determined by both a distance of an associated one of said line sections between said branch point and the end thereof and said propagation velocity on the associated line section, and means for detecting a change in propagation mode of the traveling wave due to a fault occurring on the line section having said traveling wave traveling therealong to protect the transmission line, said detecting means comparing the sum of said traveling waves passed respectively through said ends at time points $t - \tau_1, t - \tau_2, - - -, t - \tau_n$ with the sum of said traveling waves passed respectively through said ends at time points $t+\tau_1$, $t+\tau_2$, - - -, $t+\tau_n$ to detect said change in propagation mode of the traveling wave.

3. A protective relaying system comprising a protected AC transmission line including n AC line sections connected together at a branch point and having respective ends, traveling waves traveling at finite propagation velocities along said transmission line between said ends, said line sections having surge impedances $Z_1$, $Z_2$, - - -, $Z_n$ and surge propagation times $\tau_1$, $\tau_2$, - - -, $\tau_n$ each of said surge propagation times being determined by both a distance of an associated one of said line sections between said branch point and the end thereof and said propagation velocity on the associated line section, and means for detecting a change in propagation mode of the traveling wave due to a fault occurring on the line section having said traveling wave traveling therealong to protect the transmission line, said detecting means calculating values of the traveling waves as left the respective ends at time points $t+\tau_1$, $t+\tau_2$, - - -, $t+\tau_n$ from both values of the traveling waves at said respective ends at time points $t-\tau_1$, $t-\tau_2$, - - -, $t-\tau_n$ and said surge impedance $Z_1$, $Z_2$, - - -, $Z_n$ and comparing the calculated values with measured values of the traveling waves as left the respective ends at time points $t+\tau_1$, $t+\tau_2$, - - -, $t+\tau_n$ thereby to detect said change in propagation mode of the traveling wave.

4. A protective relaying system comprising a protected n-circuit three-phase transmission line having at least two ends S and R, said transmission line having a surge propagation time $\tau_k$ for the k-th mode between said ends S and R where k=1,2, - - - 3n and a surge impedance $Z_k$ for the k-th mode where k=1,2, - - -, 3n, first means for sampling a three-phase voltage and a three-phase current at said ends of said transmission line at a time point t, second means for subjecting the sampled values of said three-phase voltage and current to a predetermined mode transformation to derive voltages $f_s^k$ (t) and currents $j_s^k$ (t) where k=1,2, - - -, 3n), third means for sampling a three-phase voltage and a three-phase current at said end R of said transmission line at time points $t+\tau_k$ where k=1,2, - - -, 3n, forth means for subjecting the lastmentioned sampled values of said three-phase voltage and current to said predetermined mode transformation to derive voltages $f_r^k$ ($t+\tau_k$) and currents $j_r^k$ ($t+\tau_k$) where k=1,2, - - -,3n, fifth means using said voltages $f_s^k$ (t) and $f_r^k$ ($t+\tau_k$) and said currents $j_s^k$ (t) and $j_r^k$ ($t+\tau_k$) to calculate $$S_k(t) = j_S^k(t) + j_R^k(t + \tau_k) + \frac{1}{Z_k} \{f_S^k(t) - f_R^k(t + \tau_k)\},$$

and sixth means responsive to said calculated values $\epsilon_k(t)$ to detect a change in calculated value due to the occurrence of a fault on said transmission line thereby to protect the latter.

5. A protective relaying system comprising a protected multiple-terminal three-phase transmission line including a plurality n of m-circuit three-phase line sections connected together at a branch point X and having respective terminals K where K=1, 2, - - -, n, first means for sampling 3m phase currents and 3m phase voltages for the line section KX extending between the terminal K thereof and said branch point X, and subjecting the sampled values of said phase currents and voltages to a predetermined mode transformation to form h modes having surge impedances $Z_h^k$ and surge propagation times $\tau_h^k$ respectively where k=1, 2, ..., n and h=1, 2, - - -, 3m, second means for deriving h-th mode currents $j_k^h$ ($t-\tau_h^k$) and $j_k^h(t+\tau_h^k)$ and the h-th mode voltage $f_k^h(t-\tau_h^k)$ and $f_k^h$ ($t+\tau_h^k$) at said terminal K and at time points $t-\tau_h^k$ and $t+\tau_h^k$ respectively, third means using said derived mode currents sand voltages to calculate the h-th mode current $j_{xk}^h$ (t) directed from said branch point X to the k-th terminal K at time point t following $$j_k^h(t + \tau_h^k) + j_k^h(t - \tau_h^k) - \{f_k^h(t + \tau_h^k) - f_k^h(t - \tau_h^k)\} / Z_h^k = -Z j_{xk}^h(t)$$

where k=1, 2, - - -, n and h=1, 2, - - -, 3m, fourth means for subjecting 3m mode currents $j_{xk}^h$ (t) to a transformation inverted from said mode transformation to find three-phase currents $\hat{i}_{XK}^{ap}(t)$, $\hat{i}_{XK}^{bp}(t)$ and $\hat{i}_{XK}^{cp}(t)$ respectively where K=1, 2, - - -, n and p=1, 2, - - -, m, fifth means for calculating the sums of the individual phase currents $$\epsilon^{ap}(t) = \sum_{K=1}^{n} \hat{i}_{XK}^{ap}(t), \quad \epsilon^{bp}(t) = \sum_{K=1}^{n} \hat{i}_{XK}^{bp}(t) \text{ and}$$

$$\epsilon^{cp}(t) = \sum_{K=1}^{n} \hat{i}_{XK}^{cp}(t)$$

on the three phases respectively, and sixth means for detecting changes in said calculating sums due to an internal fault occurring on said multiple-terminal transmission line whereby the transmission line is protected.

* * * * *